United States Patent
Paul et al.

(10) Patent No.: US 9,483,657 B2
(45) Date of Patent: Nov. 1, 2016

(54) SECURE ONLINE DISTRIBUTED DATA STORAGE SERVICES

(71) Applicant: Accenture Global Services Limited, Dublin (IE)

(72) Inventors: Sanjoy Paul, Bangalore (IN); Shubhashis Sengupta, Bangalore (IN); Annervaz Karukapadath Mohamedrasheed, Trichur (IN); Amitabh Saxena, Bangalore (IN); Vikrant Kaulgud, Pune (IN)

(73) Assignee: Accenture Global Services Limited, Dublin (IE)

( * ) Notice: Subject to any disclaimer, the term of this patent is extended or adjusted under 35 U.S.C. 154(b) by 253 days.

(21) Appl. No.: 14/152,452

(22) Filed: Jan. 10, 2014

(65) Prior Publication Data

US 2014/0201541 A1 Jul. 17, 2014

(30) Foreign Application Priority Data

Jan. 14, 2013 (IN) .............................. 184/CHE/2013

(51) Int. Cl.
*G06F 12/14* (2006.01)
*G06F 21/62* (2013.01)

(52) U.S. Cl.
CPC ................................. *G06F 21/6245* (2013.01)

(58) Field of Classification Search
CPC ........... G06F 21/6245; G06F 21/6218; G06F 21/6227; G06F 21/32; G06F 21/72; G06F 11/1076; G06F 11/1088; G06F 11/1092; H04L 9/085; H04L 9/0861
USPC .......... 713/168, 189, 193, 194; 714/15, 758, 714/821
See application file for complete search history.

(56) References Cited

U.S. PATENT DOCUMENTS

| | | | |
|---|---|---|---|
| 2010/0037056 A1* | 2/2010 | Follis ................. | G06F 11/1464 713/171 |
| 2010/0094921 A1 | 4/2010 | Roy et al. | |
| 2010/0299313 A1 | 11/2010 | Orsini et al. | |
| 2011/0184997 A1 | 7/2011 | Grube et al. | |
| 2012/0047339 A1* | 2/2012 | Decasper ............ | G06F 11/1076 711/162 |
| 2012/0166818 A1* | 6/2012 | Orsini .................... | H04L 9/085 713/193 |
| 2012/0173925 A1* | 7/2012 | Lahdensivu ........ | G06F 11/1008 714/15 |

FOREIGN PATENT DOCUMENTS

WO   WO 2012/021734 A1   2/2012

OTHER PUBLICATIONS

European Search Report from Germany, DP/P130633EP00, Mar. 21, 2014.
Article: CRUST: Cryptographic Remote Untrusted Storage without Public Keys, written by Erel Geron and Avishai Wool, © 2007 IEEE Computer Society.

* cited by examiner

*Primary Examiner* — Kambiz Zand
*Assistant Examiner* — Noura Zoubair
(74) *Attorney, Agent, or Firm* — Brinks Gilson & Lione

(57) ABSTRACT

The data vaporizer provides secure online distributed data storage services that securely store and retrieve data in a public distributed storage substrate such as public cloud. The data vaporizer vaporizes (e.g., fragmented into tiny chunks of configurable sizes) data and distributes the fragments to multiple storage nodes so that the data is not vulnerable to local disk failures, secures data so that even if some of the storage nodes are compromised, the data is undecipherable to the attacker, stores data across multiple cloud storage providers and/or parties using keys (e.g., tokens) provided by multiple parties (including the owners of the data) and maintains data confidentiality and integrity even where one or more data storage provider is compromised. The data vaporizer is configurable for different domain requirements including data privacy and anonymization requirements, encryption mechanisms, regulatory compliance of storage locations, and backup and recovery constraints.

21 Claims, 14 Drawing Sheets

| Tolerance Level (number of simultaneous failure of Clouds / Storage Zone supported) | | Number of Clouds / Storage Zones | | | | |
|---|---|---|---|---|---|---|
| Simultaneous Failures | Storage Zone | 1 | 2 | 3 | 4 | 5 |
| 1 | With Replication | | 200 | 200 | 200 | 200 |
| | With DV (EC) | | 200 | 160 | 140 | 140 |
| 2 | With Replication | | | 300 | 300 | 300 |
| | With DV (EC) | | | 300 | 220 | 180 |
| 3 | With Replication | | | | 400 | 400 |
| | With DV (EC) | | | | 400 | 280 |

FIG. 13

SECURE ONLINE DISTRIBUTED DATA STORAGE SERVICES

TECHNICAL FIELD

The present description relates generally to a system and method, generally referred to as a system, for anonymizing (de-identifying), encrypting and fragmenting data and storing the data across multiple storage providers by encapsulating various backend services and application program interface (APIs), and more particularly, but not exclusively, to commissioning and decommissioning cloud based storage based on storage needs, security needs, cost and performance.

BACKGROUND

Many technology companies provide on-line storage solutions on the cloud. However, considerable skepticism exists regarding security, integrity and confidentiality of data in cloud-based storage. The real and perceived threats to security have been impediments to move data to the cloud. Cloud storage providers support data encryption, access control mechanisms to stored data, and various local failure protection mechanisms such as replication and redundant arrays of inexpensive disks (RAID). However, the solutions adopted in these sites are proprietary and not adaptable to client needs, and many storage sites are vulnerable to total technical failure or organized hacking attacks resulting in service unavailability and data breaches.

SUMMARY

Various embodiments of the present invention include a system and method that, among other capabilities, breaks data into fragments and distributes the fragments to multiple storage nodes in the cloud so that the data is not vulnerable to local disk failures. For purposes of discussion herein, this system and method are referred to generally as a Data Vaporizer (DV).

In one embodiment, the DV system may be implemented on a platform that includes a communications interface and a non-transitory memory coupled with a processor, where the communications interface is configured to receive input data blocks that comprise data fields, and receive the user storage constraints from a user into the memory. The DV system may include computer executable instructions stored on the memory that when executed by the processor comprises a shuffler configured to anonymize the data fields of each of the one or more input data blocks, an encryptor configured to: generate a cipher key and encrypt, using the cipher key, the anonymized data fields based on the user storage constraints and/or encryption strength (e.g., key length) requirements to obtain a ciphertext file comprising ciphertext data blocks, an erasure coder configured to: generate coded chunks from the ciphertext data blocks and erasure coding details based on storage redundancy and fault tolerance constraints, and a distributor configured to: distribute the coded chunks to two or more cloud storage providers based on the user storage constraints; and generate distribution details for the distributed coded chunks. The encryptor may be configured to: generate an encryption key for the ciphertext file from the shuffle key, the cipher, the erasure coding details, and the distribution details, wherein the communications interface communicates the encryption key to the user. In another embodiment, the DV system may also include a secret sharer configured to: generate a set of secret shares of the encrypted combined metadata across multiple cloud storage locations and secret share keys from the encryption key; and a secret sharer distributor configured to: distribute the secret shares to the cloud storage providers, where the distributed coded chunks and secret shares stored together at each of the cloud storage providers are identified as cloud shares (storage shares), so that the cloud storage providers cannot collude together to decrypt and retrieve the data. Preferably, the user storage constraints may include: a customer type that identifies an industry of the user and a type of data from which the input data blocks are comprised; a domain compliance for the industry of the user that identifies a type of data compliance, the type of data compliance comprising Health Insurance Portability and Accountability Act (HIPAA), financial, or multi-media; a fault tolerance threshold; a security type, or a security threshold, or both; a retrievability threshold that identifies a probability of retrieving stored data blocks; a repairability threshold that identifies a probability of repairing stored data blocks; simultaneous provider attacks threshold that identifies a subset of the number of the cloud storage providers required to aggregate the cloud shares to re-generate the encryption key communicated to the user; or budget for storage and retrieval of the input data blocks; or any combination thereof. Thus, even if multiple storage providers (e.g., cloud storage) are unavailable (e.g., due to outage or corruption) and/or collusion is attempted between some number of storage providers (e.g., aggregating metadata such as security information necessary to retrieve the stored data), the system is able to retrieve and/or prevent service provider collusions regarding stored data based on a configurable threshold parameter. The system may be configured to minimize the number of service providers (e.g., cloud storage providers) required to retrieve the data to restore corrupted data, and maximize the number of service providers needed to collude (e.g., aggregate security metadata) in order to compromise the data.

In yet another embodiment, the DV system may also include: a protector; a retriever; and a decoder. The protector is configured to: interrogate the cloud shares by executing a corrupt or modified block check to test the retrievability of the distributed coded chunks and secret shares of the cloud shares; mark the distributed coded chunks and secret shares that fail the corrupt or modified block check; and communicate the distributed coded chunks and secret shares that fail the corrupt or modified block check to the retriever. The retriever is configured to: retrieve a number of the uncorrupted cloud data shares from the cloud storage providers; re-generate the encryption key from the secret shares of the uncorrupted data shares; retrieve, using the re-generated encryption key, the uncorrupted data shares from the cloud storage providers; and communicate the retrieved uncorrupted distributed coded chunks to the decoder. The decoder is configured to: decode the retrieved uncorrupted distributed coded chunks to obtain the data fields of the input data blocks for the corrupted distributed coded chunks; re-code the data fields of the input data blocks for the corrupted distributed coded chunks; and communicate the re-coded chunks to the distributor to distribute the re-coded chunks to the cloud storage providers based on the user storage constraints; and generate distribution details for the distributed re-coded chunks. Preferably, the DV system may generate a new encryption key for the ciphertext file from the shuffle key, the cipher, the erasure coding details, and the distribution details for the distributed re-coded chunks, generate a new set of secret shares and new secret share keys from the new encryption key, and distribute the secret shares to the cloud storage providers, and communicate the new encryption key to the user.

In preferred embodiments, the data vaporizer provides secure online distributed data storage services that securely store and retrieve data in a public distributed storage substrate such as public cloud. The data vaporizer: vaporizes (e.g., fragmented into tiny chunks of configurable sizes) data and distributes the fragments to multiple storage nodes so that the data is not vulnerable to local disk failures; secures data so that even if some of the storage nodes become compromised, the data is undecipherable to the attacker; stores data across multiple cloud storage providers and/or parties using keys (e.g., tokens) provided by multiple parties (including the owners of the data); and maintains data confidentiality and integrity even where one or more data storage providers is compromised. The data vaporizer is configurable for different domain requirements including data privacy and anonymization requirements, encryption mechanisms, regulatory compliance of storage locations, and backup and recovery constraints.

In more preferred embodiments, the Data Vaporizer (DV) securely stores data in a fault tolerant manner across multiple cloud storage locations (e.g., one or more cloud service provider). The Data Vaporizer (DV) vaporizes the data (e.g., fragments the data into small encoded chunks and stores the chunks across multiple nodes) in the cloud in such a way that failure of a number of storage nodes (and/or corruption of data) up to a configurable threshold do not impact the data availability. The DV provides users a way to customize a security configuration for data in terms of anonymization, encryption strength (e.g., key length), and erasure coding ratio for fault-tolerance. The DV provides users a way to customize the distribution scheme for the data across storage providers (e.g., cloud storage providers). The DV creates message authentication codes (MAC) for each encoded portion of data. The MAC prevents malicious attackers from corrupting the data and the DV may preserve the integrity and authenticity of the shares using the MAC. Preferably, the DV also generates combined (e.g., composite) metadata (containing shuffle key, encryption key, erasure coding details, MAC details, and distribution details for the anonymized data). The DV secret shares encrypted composite (e.g., combined) metadata across multiple cloud storage services. The DV communicates the encryption key of the metadata to the user (e.g., customer).

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 13 illustrates an exemplary DV data distribution chart that identifies a number of clouds per storage zones usable to ensure a tolerance level.

DETAILED DESCRIPTION

Figure 1:
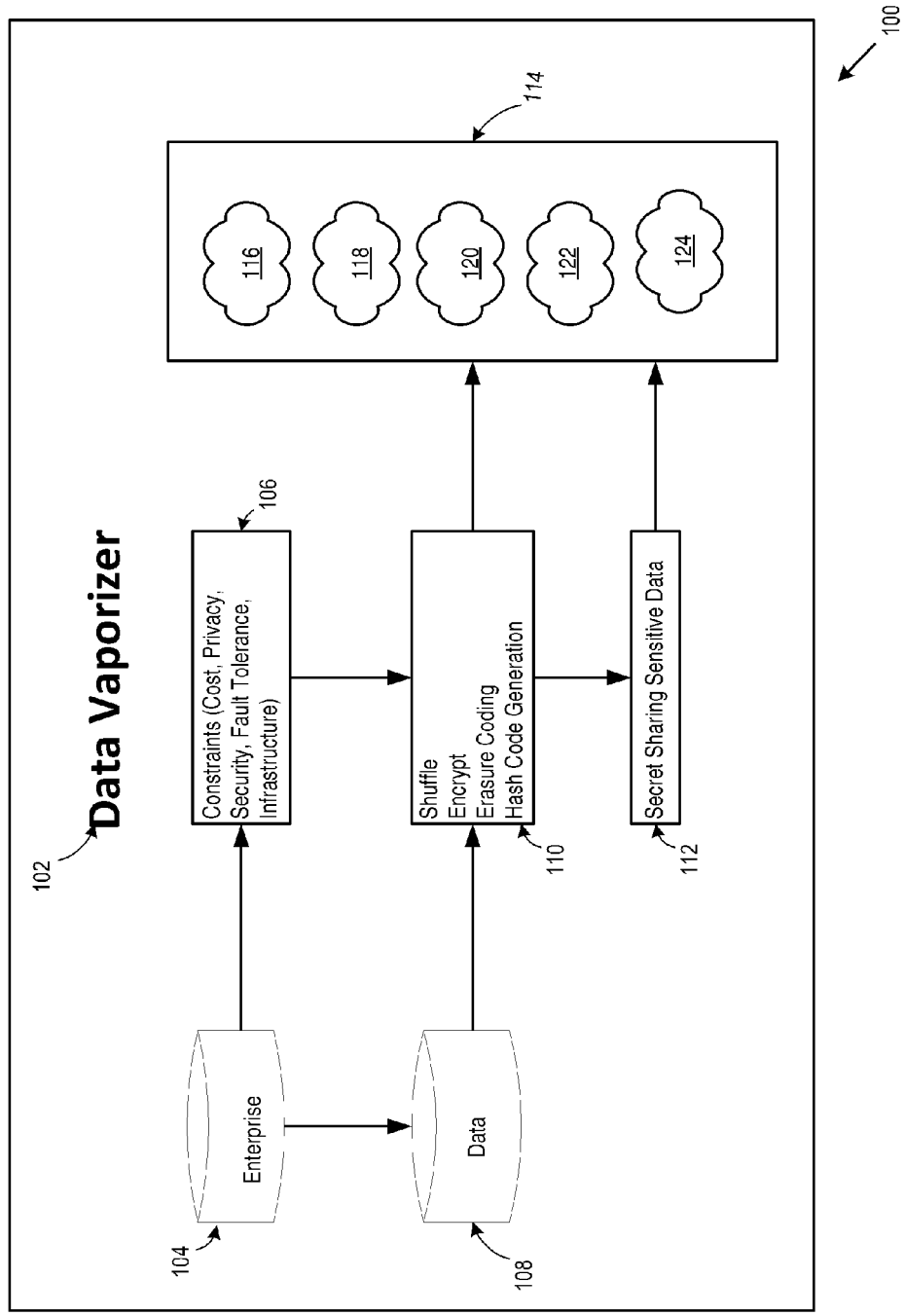
FIG. 1 is a block diagram of the data vaporizer (DV).

The data vaporizer may be user (e.g., client, subscriber) configuration driven, multi-site (e.g., storage locations) and agnostic to cloud providers (e.g., no preference for a particular provider). The data vaporizer allows customization and de-coupling of clients' data security concerns from what capabilities exist at the storage site of the provider. The Data Vaporizer also supports added resilience because the data vaporizer is unaffected by (e.g., immune to) local site failures or attacks. Additionally, the Data Vaporizer provides a seamless interface for storing data across multiple storage providers (e.g., by encapsulating various backend services and APIs). An enterprise may use the Data Vaporizer in multiple ways, including commissioning and decommissioning cloud storage based on storage, security, cost, and/or performance requirements and preferences.

The Data Vaporizer may work in a multi-stage process. For example, the Data Vaporizer may employ multiple processing stages (e.g., three stages), including a stage (A) where the Data Vaporizer prepares one or more input data blocks and makes the input data blocks ready for cloud storage, where an input data block is passed through a data anonymization module (e.g., "Shuffler"), a data encryption module (e.g., "Encryptor"), the erasure coding module which creates encoded data fragments (e.g., "coder"), and a shared secret key generator module (e.g., a "Key generator"). The Data Vaporizer may employ a stage (B) where a data distribution module (e.g., "Distributor") communicates the encoded data fragments to multiple cloud storage locations identified by the user as a distribution plan. The Data Vaporizer may further employ a stage (C) where the Data Vaporizer provides a pull-based alert mechanism (e.g., a "protector") that guards the stored data against storage media corruption and/or malicious attacks and finally, data can be retrieved through a "retriever" module.

The DV is responsive and provides a way to store data across multiple storage providers (e.g., cloud) in such a manner that the data protection parameters may be customized by user input and other requirements (e.g., regulatory, industry) and the data stored across cloud sites remain unaffected by (e.g., immune to) simultaneous failures (e.g., corruption and/or malicious attacks) at one or more sites.

The Data Vaporizer provides a multi-stage data preparation approach that can be done at the client site. The proposed approach makes the security parameters customizable to client's needs. The Data Vaporizer also provides a multi-provider (e.g., service provider) and multi-site data distribution strategy that guards customer data (and data-related operations) against one or more concurrent failures at some number of configurable sites. The configurable parameters used for the data distribution strategy across sites can further be guided through an optimization algorithm. Currently, no such customizable approach (e.g., tunable for security and/or performance) exists for client data to be stored, maintained and retrieved from multiple cloud storage sites.

FIG. 1 is a block diagram 100 of the data vaporizer 102. The data vaporizer provides fault tolerance and secure storage of data in the cloud with customizable levels of security, confidentiality and privacy. The data vaporizer may receive constraints 106 (e.g., storage constraints that may include cost, privacy, security, fault tolerance, and infrastructure constraints) from one or more enterprises 104 for data to be stored by the data vaporizer 102. The data vaporizer (DV) securely stores data in a fault tolerant manner across multiple cloud storage services (providers). The DV allows a configurable and secure storage substrate on the cloud (e.g., public and/or private). The data vaporizer provides a configurable 'vaporizer' service that stores data securely in the cloud by applying multiple stages of security techniques and service level agreement (SLA) requirements to the data. The data vaporizer receives the data 108 to be stored, and based on the constraints 106 and the data 108 to be stored, determines a storage scheme 110 (e.g., the size of fragments of the data 108 and shuffles the data) that includes de-identifying (e.g., anonymizing) the data, which includes determining an encryption technique to use to encrypt the data, applying erasure coding and generating a hash code for the data. The data vaporizer vaporizes (e.g., fragments the data into small encoded data chunks and stores the data across multiple processing (computing) nodes) the data in the cloud in such a way that failure (e.g., corruption of data) of one or more storage nodes up to a configurable fault tolerance threshold do not impact the availability (e.g. retrieval) of the stored data. Accordingly, the DV provides users (e.g., owners of the data) the ability to customize one or more security configurations for the data to be stored, including anonymization, encryption strength (e.g., key length), and erasure coding ratio for fault-tolerance. The DV also provides users (e.g., owner of the data) the ability to customize the distribution scheme for the data across cloud providers. DV generates (creates) message authentication codes (MAC) for each encoded data chunk (e.g. anonymization). The MAC codes prevent malicious attackers from decrypting the data because the key is stored separate from the data and can detect data corruption. The DV generates composite (e.g., combined) metadata generated (e.g., created) from the metadata containing encryption data, erasure coding details, MAC details and distribution details (e.g., cloud storage locations). The DV stores secret shares 112 of the encrypted combined metadata across multiple cloud storage locations 114 (e.g., 116, 118, 120, 122, 124) (e.g., multiple locations within and external to one or more cloud service providers' computing environments), and provides the encryption key of the metadata to the customer. The one or more cloud service providers may include, but are not limited to, Amazon® S3, RackSpace®, CloudFile®, and Mozy®.

The Data Vaporizer provides a way to use inexpensive (e.g., cost effective) cloud storage to store data on multiple clouds, with privacy and confidentiality so that no meaningful information may be analyzed and/or extracted from the stored data. The Data Vaporizer provides fault tolerance to ensure that data may be available even if a configurable number of storage services (e.g., service providers and storage locations of the service providers) are not available and/or functioning. The Data Vaporizer avoids vendor (e.g., one or more cloud service providers) lock-in by distributing data (e.g., fragments of configurable sizes) across multiple storage locations (e.g., one or more sites and/or one or more service providers) so that critical dependency on one or more vendors is minimal. The Data Vaporizer anonymizes and distributes the data and secret key metadata information in a manner to ensure that the stored data may not be compromised by service providers and/or attackers of the service providers conspiring with each other. The Data Vaporizer ensures that the data stored and retrieved data match (e.g., without loss of information so that what is stored is what is retrieved). The Data Vaporizer provides users a highly configurable data storage process, according to the needs and budget of the user, that includes a way to configure the data storage to comply with user selected (e.g., identified) industry standards (e.g., HIPAA, Finance and Banking).

Table 1 illustrates modules and terms used by the Data Vaporizer.

TABLE 1

DV modules and Terms

File or Volume - The data file or directory to be stored.
Shuffler module - Anonymizes data based on client and domain requirements
Encryptor module - Applies Encryption algorithms to the anonymized data.
Coder/Decoder module - Separates the input data file into blocks, performs the operations of erasure, regeneration or any other network coding and decoding on the data blocks, and generates MAC codes for each coded block.
Block - A configurable portion of a file or volume (e.g., ciphertext or plaintext).
Code - A piece of erasure coded data that are ready to be distributed (e.g., vaporized) into the cloud. Several codes may be generated for each block.
Cloud Code - Coded data stored on (e.g., vaporized to) the cloud.
Key - A piece of information (e.g., a parameter) that determines the functional output of a cryptographic algorithm or cipher.
Share - A piece (e.g., share) of the key, which is generated via Shamir's secret sharing (discussed further below).
Provider - A cloud storage provider service (e.g., Amazon ® S3, Rackspace CloudFile ®, and Mozy ®.)
Distributor module - Distributes the shares to each cloud storage provider.
Metadata generator module - Generates and/or collects metadata for the to-be-stored data blocks. The metadata is generated by combining the encryption key, erasure coding details, MAC key, shares details and structure of the data). In some cases, the provider may provide the same or different encryption and/or other error correction code.

TABLE 1-continued

DV modules and Terms

Secret Sharer module - Uses a secret key sharing algorithm to distribute fragments of metadata across multiple parties (e.g., providers, clients, and trustworthy third parties). The keys for each cryptography operation may be different for each data block.
Protector module - Uses the MAC key (stored in a secure location) to protect the data shares against malicious attack or corruption, and creates alerts against breaches and corruption of data, and may regenerate shares with the assistance of the Retriever and Distributor modules.
Retriever module - Retrieves the data blocks from appropriate shares through a block fetching and decoding operation.
DV Master module - Determines the processing (e.g., logic and/or instructions) used by the data vaporizer based on customer parameters, infrastructure availability and requirements, and determines the various parameters to use in each step in the processing.

Figure 2:
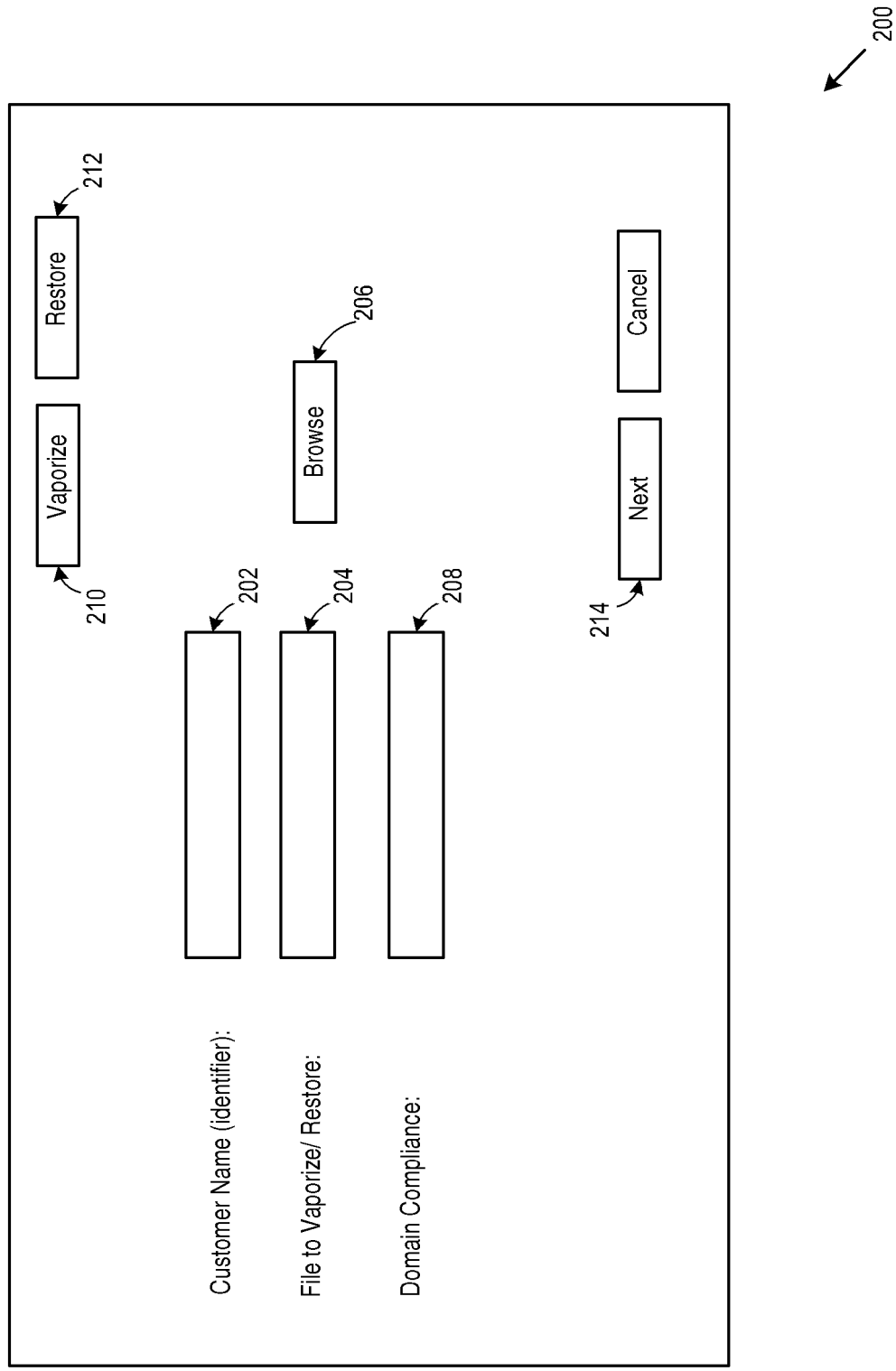
FIG. 2 illustrates an exemplary vaporizer basic display generated by the data vaporizer.

FIG. 2 illustrates an exemplary vaporizer basic display 200 generated by the data vaporizer 102. The vaporizer basic display 200 may present fields for user input or selection, including customer name 202 (e.g., customer and/or account identifier) that may identify the customer type (e.g., HIPAA, financial, multi-media user and identifies an industry for the user (customer) and the type of data to be vaporized), a file name 204 (e.g., with storage location information) that the user may either input the filename information or select using the 'browse' button 206 to search the directory structure for the location of the file (e.g., data for vaporizing or restoring). The vaporizer basic display 200 may also present the user with a domain compliance selection field 208 (e.g., HIPAA, financial, multi-media) that identifies the type of data compliance the data vaporizer 102 may use when vaporizing (or restoring) the data. The user may select the vaporize 210 button to initiate vaporization of the user data, the restore button 212 to restore a previously vaporized data, or the 'next' button 214 to further configure the parameters to use to vaporize the user data. When the user selects the restore button 212, the DV may navigate to the restore basic display 500, discussed further below.

Figure 3:
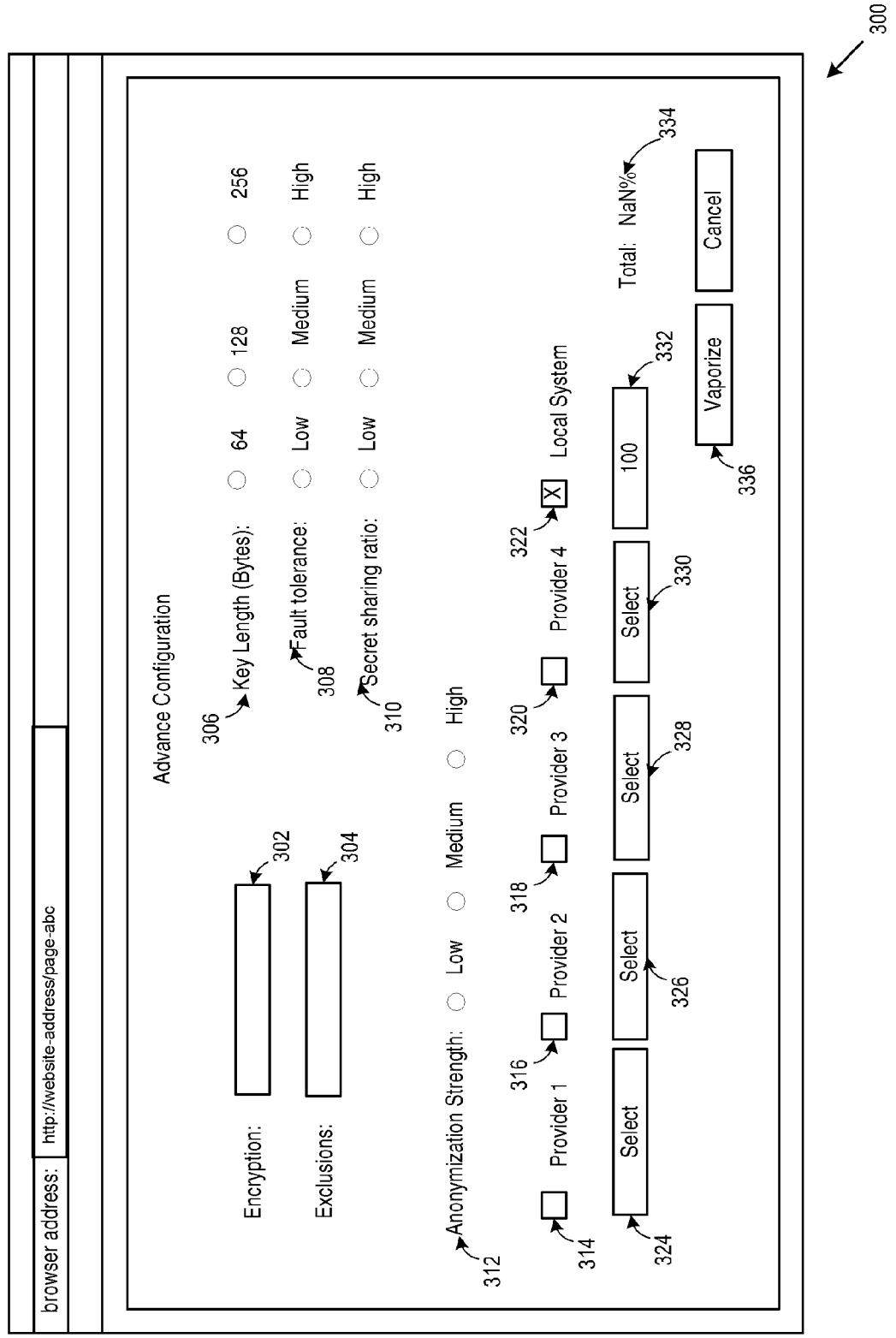
FIG. 3 illustrates an exemplary advance vaporizer configuration display generated by the data vaporizer.

FIG. 3 illustrates an exemplary advance vaporizer configuration display 300 generated by the data vaporizer 102. The advance vaporizer configuration display 300 may present fields for user input and/or selection, including: an encryption field 302 that identifies the type (e.g., and/or level) of encryption to use; and an exclusions field 304 that allows the user to select or exclude certain geographic zones for storing data. For example, a user may indicate to exclude "Non-US sites" which will ensure that data is not stored outside USA. Exclusions may be strung together with a comma delimited string (e.g., "Asia, Europe"). The fields may further include key strength (e.g., key length) options 306 (e.g., 64 bytes, 128 bytes and 256 bytes) that identify the number of bytes to use to generate an encryption key; fault tolerance options 308 (e.g., low, medium and high); secret sharing ratio options 310 (e.g., low, medium and high) (See Table 4 below for further details); anonymization strength options 312 (e.g., low, medium and high) (e.g., the degree of anonymization applied to the data); service providers and local system fields (e.g., 314, 316, 318, 320 and 322) (e.g., Amazon® EC2, Rackspace®, Dropbox®, Google® drive and local system) to identify the one or more service providers to use; and service provider percent utilization fields (324, 326, 328, 330, 332) usable to select the percentage (e.g., the value of 100 for utilization field 332 indicates 100% of the data is stored at the local system 322) of the data to store (distribute) to the corresponding service providers selected from the service providers' fields. The DV calculates the total percentage of data allocated 334 to determine whether the percentage of the data allocated to be stored at the providers (314, 316, 318, 320, 322) is 100%, and when the percentage of the data that has been allocated to be stored at the providers (314, 316, 318, 320, 322) does not equal 100%, the DV may prompt the user to allocate unallocated percentages of the data to be stored when the total percentage of data allocated 334 does not equal 100%. When the total percentage of data allocated equals 100%, the user selects the vaporize button 336 to vaporize the data according to the user inputs.

The Data Vaporizer may be used as a standalone module or an add-on to one or more existing security modules of one or more cloud storage providers and/or as a plug-in to a cloud integration service provider (e.g., Informatica® or Dell Boomi®). The Data Vaporizer (e.g., a DV service configuration) may be used to devise a suite of cost and SLA-directed archival and data recovery service.

The Data Vaporizer may be configured to generate (create) different vaporization plans for different user cases (e.g., customer scenarios), depending on the customer anonymization and encryption requirements, compliance requirements, redundancy choices, and geographical choice.

For example, a customer 1 may be in the healthcare industry (e.g., healthcare domain) and require and/or desire the following constraints to use to store the data of customer 1, including: compliance with Health Insurance Portability and Accountability Act (HIPAA) regulations; a low fault tolerance; weak encryption (e.g., relaxed security); and high anonymization. A customer 2 may be in the financial industry (e.g., financial domain) and require and/or desire the following constraints to use to store the data of customer 2, including: compliance with Payment Card Industry (PCI) Data Security Standards; high fault tolerance; stringent security requirements (e.g., strong encryption); and low anonymization requirements.

For customer 1, the Data Vaporizer may use erasure coding granularity of 350 bytes, so that the Data Vaporizer does not store together data columns specified by HIPAA, an erasure coding ratio of 4/10 for appropriate fault tolerance support, and secret sharing numbers of 2/7 to prevent vendor attacks from at least two storage providers (e.g., cloud service providers).

For customer 1, the Data Vaporizer may execute and/or perform the following process steps, including: substitution encryption; column shuffling; Encryption (e.g., triple data encryption standard algorithm (referred to as 3DES, TDEAS and/or Triple DEA)); Erasure Coding using a granularity of 350 Bytes and ratio of 4/10; MAC Hashing; Distribution; Sensitive Data Accumulation; Encryption and Secret Sharing of Sensitive Information using a ratio of 2/7; and Distribution of Secret Shared Sensitive Information.

For customer 2, the Data Vaporizer may use erasure coding granularity of 200 bytes, so that the Data Vaporizer does not store together data columns specified by PCI, an erasure coding ratio of 6/10 for appropriate fault tolerance support, and secret sharing numbers of 4/7 to prevent vendor attacks from at least four storage providers (e.g., cloud service providers) and/or attackers of the service providers conspiring with each other.

For customer 2, the Data Vaporizer may execute and/or perform the following process steps, including: column Shuffling; encryption (e.g., Advanced Encryption Standard AES-256); Erasure Coding using a granularity of 200 Bytes; a ratio of 6/10; MAC Hashing; Distribution; Sensitive Data Accumulation; Encryption and Secret Sharing of Sensitive Information using a ratio of 4/7; and Distribution of Secret Shared Sensitive Information.

The Data Vaporizer may determine the DV Parameters to use based on customer (e.g., user) provided customer parameters, including: a customer type identifier (e.g., gold, silver, bronze) that determines the minimum SLA (service level agreement), fault tolerance and security required and/or desired by a customer; a customer Domain (e.g., industry such as Finance and Health Care) that determines the regulatory standards to use; a Customer Budget which may determine the maximum possible fault tolerance and security provided, over and above the values determined based on the customer type and customer Domain (e.g., industry); and one or more Time Constraints. The Data Vaporizer may use the Customer Budget and Time Constraints to determine the amount of data to store in each storage location (e.g., cloud storage service).

Table 2 illustrates a lookup algorithm that may be used by the DV to determine DV parameters.

TABLE 2

Lookup algorithm to determine DV Parameters

BEGIN
Input X
/* X is the Level of customer (X=1 implies Gold, X=2 implies Silver, X=3 implies Bronze.) */
Input Y
/* Y is the Application Business Domain (Y=1 implies Healthcare, Y=2 implies Finance, Y=3 implies Media)
Vector (a, b, c) = Customer_Application_Matrix (X, Y)
/*Elaborate version of matrix illustrated in Table 3 below */
/* Retrieve the parameters with which the Data Vaporizer algorithm will run based on the inputs X and Y */
/* a=level of anonymity, b=level of encryption, c= level of fault tolerance, other parameters illustrated in Table 3 below */
/* Customer_Application_Matrix is a two-dimensional matrix indexed by level of customer and application business domain and the entries contain pre-specified values of a, b, and c */
Vaporize (a ,b, c)
END Table 3 illustrates an example of the parameter selections a user may select to vaporize the data of the user for various levels or categories of user services.

TABLE 3

Parameter Selections

| Customer Domain | Customer Type | | |
|---|---|---|---|
| | Gold | Silver | Bronze |
| Finance | FT: 4 | FT: 2 | FT: 1 |
| | ECR: 6/10 | ECR: 8/10 | ECR: 9/10 |
| | ECG: 100 Bytes | ECG: 200 Bytes | ECG: 250 Bytes |
| | SE: Yes | SE: No | SE: No |
| | CS: Yes | CS: Yes | CS: No |
| | SSR: 5/7 | SSR: 3/7 | SSR: 2/7 |
| | ES: AES 256 | ES: AES 192 | ES: AES 128 |
| | BM: SMAM | BM: SMAM | BM: SMAM |
| Health Care | FT: 3 | FT: 2 | FT: 1 |
| | ECR: 7/10 | ECR: 8/10 | ECR: 9/10 |
| | ECG: 50 Bytes | ECG: 150 Bytes | ECG: 350 Bytes |
| | SE: Yes | SE: Yes | SE: No |
| | CS: Yes | CS: Yes | CS: Yes |
| | SSR: 4/7 | SSR: 2/7 | SSR: 2/7 |
| | ES: 3DES | ES: 3DES | ES: 3DES |
| | BM: SMAM | BM: SMAM | BM: SMAM |

Table 4 illustrates the descriptions for the user selectable parameters illustrated in Table 3.

TABLE 4

Description of the Parameter Selections

FT: Fault Tolerance - X: Indicates the number of storage sites that may fail without preventing the retrieval of the data (without data loss).
ECR: Erasure Coding Ratio - X/Y: indicates the number of storage sites (e.g., nodes) X out of Y sites that may fail without preventing the retrieval of the data (without data loss).
ECG: Erasure Coding Granularity - X: indicates the block length in bytes used for erasure coding, determined by the anonymization requirement (e.g., level of anonymity).
SE: Substitution Encryption - YES, NO: Indicates whether to perform Substitution encryption, in order to ensure compliance with user specified and/or DV determined standards.
CS: Column Shuffling - YES, NO: Indicates whether to perform Column Shuffling in order to be compliant with user specified and/or DV determined standards.
SSR: Secret Sharing Ratio - X/Y: Indicates the number of storage sites (e.g., nodes) X out of Y sites usable to aggregate the sensitive metadata secret shared by the DV in order to decode the sensitive metadata.
ES: Encryption Standard, Strength - AES, 3DES: Indicates which encryption standard with key strength the DV may use to store the user's data.
BM: Back Up Mode - Indicates the backup mode the DV may use, including the Single Module Archival Mode (SMAM) and the Multiple Modules Frequent Access Mode (MMFAM).

The DV provides a way to recover the original data even in the case of unavailability/corruption at multiple locations (e.g., service providers) and prevent colluding parties from reconstructing the original data by sharing information spread between the colluding parties.

Table 5 illustrates various nuances of configuring the DV for unavailable and/or corrupt service provider sites and preventing collusion. Consider (3, 5) (e.g., configured so that 3 out of 5 sites may be corrupt and/or collude) redundant coding and assume the following distribution of the 5 blocks among cloud providers A, B, C and D as follows A: 1 block, B: 1 block, C: 1 block, D: 2 blocks. The terms used in the table below are explained: Recovery "to reconstruct complete original data with available blocks"; Collusion "to share information for recovering the secret key"; Reconstruction via Collusion "to reconstruct the complete original data with available blocks by colluding parties"; and Partial Reconstruction via Collusion "to reconstruct some part of the original data with available blocks by colluding parties".

TABLE 5

Unavailability/Corruption vs. Secret Sharing

| Unavailability/Corruption | Secret Sharing (1, 4) | Secret Sharing (2, 4) | Secret Sharing (3, 4) | Secret Sharing (4, 4) |
|---|---|---|---|---|
| A | Recovery: Yes<br>Collusion: Yes<br>Reconstruction via Collusion: Yes<br>Partial Reconstruction via Collusion: Yes | Recovery: Yes<br>Collusion: Yes<br>Reconstruction via Collusion: Yes<br>Partial Reconstruction via Collusion: Yes | Recovery: Yes<br>Collusion: Yes<br>Reconstruction via Collusion: Yes<br>Partial Reconstruction via Collusion: Yes | Recovery: Yes<br>Collusion: No<br>Reconstruction via Collusion: No<br>Partial Reconstruction via Collusion: No |
| A, B | Recovery: Yes<br>Collusion: Yes<br>Reconstruction via Collusion: Yes<br>Partial Reconstruction via Collusion: Yes | Recovery: Yes<br>Collusion: Yes<br>Reconstruction via Collusion: Yes<br>Partial Reconstruction via Collusion: Yes | Recovery: Yes<br>Collusion: No<br>Reconstruction via Collusion: No<br>Partial Reconstruction via Collusion: No | Recovery: Yes<br>Collusion: No<br>Reconstruction via Collusion: No<br>Partial Reconstruction via Collusion: No |
| A, D | Recovery: No<br>Collusion: Yes<br>Reconstruction via Collusion: No<br>Partial Reconstruction via Collusion: Yes | Recovery: No<br>Collusion: Yes<br>Reconstruction via Collusion: No<br>Partial Reconstruction via Collusion: Yes | Recovery: No<br>Collusion: No<br>Reconstruction via Collusion: No<br>Partial Reconstruction via Collusion: No | Recovery: No<br>Collusion: No<br>Reconstruction via Collusion: No<br>Partial Reconstruction via Collusion: No |
| A, B, C | Recovery: No<br>Collusion: Yes<br>Reconstruction via Collusion: No<br>Partial Reconstruction via Collusion: Yes | Recovery: No<br>Collusion: No<br>Reconstruction via Collusion: No<br>Partial Reconstruction via Collusion: No | Recovery: No<br>Collusion: No<br>Reconstruction via Collusion: No<br>Partial Reconstruction via Collusion: No | Recovery: No<br>Collusion: No<br>Reconstruction via Collusion: No<br>Partial Reconstruction via Collusion: No |

Referring to Table 5, the case of unavailability (A, B) and secret sharing (3, 4), note that although A and B are unavailable, original data can be recovered as 3 out of 5 blocks are available. Accordingly, 'Recovery' is set to "Yes". However, since secret sharing is (3, 4), we need 3 providers to collude and only 2 are available, so collusion is set to "No". The reconstruction of the original data by the colluding parties is not possible. Hence, Reconstruction via Collusion is set to "No". Thus, recovery is possible from available fragments but Reconstruction is NOT possible by the colluding parties. In this case as collusion is not possible, partial reconstruction of the data by the colluding parties is also not possible.

Referring again to Table 5, the case of unavailability (A, D) and Secret Sharing (2, 4), note that as A and B are unavailable, original data cannot be recovered as 2 out of 5 blocks are available. Accordingly, 'Recovery' is set to "No". However, since secret sharing is (2, 4), we need 2 providers to collude and 2 are available, so collusion is set to "Yes". However, even if the providers B and C collude, they cannot reconstruct the original data as only 2 out of 5 blocks are available between the two of them. Hence, Reconstruction via Collusion is set to "No". Thus, collusion is possible but reconstruction of the original data is not possible even if the parties can collude. But in this case as collusion is possible, partial reconstruction of the original data by the colluding parties using the available blocks is possible.

The DV may use one or more backup modes, including a Single Module Archival Mode (SMAM) and a Multiple Modules Frequent Access Mode (MMFAM). The SMAM processes the whole data as a bulk block and the entire process is initiated. Under the SMAM, access to data involves acquiring (e.g., receiving and/or retrieving) major parts of data. The update and read operation of the SMAM mode may require a relatively long time to complete based on the size (e.g., amount) of data. The DV allows the user to select the SMAM for the purpose of data archival storage.

The MMFAM processes the whole data as multiple sub modules (e.g., at the file level or at equally divided blocks of the whole data). For each sub module, the DV stores the metadata, in order to ease access to the data of the sub module without decoding the whole data (e.g., entire data set). The DV allows the user to select the MMFAM to store the data that may be accessed and/or updated frequently and partially.

The DV analyzes the customer Budget and Time Constraints, depending on the SLA guaranteed (e.g., selected by the customer and/or determined by the DV based on customer parameters). The DV performs a validity check to determine whether the SLA may be satisfied given the customer budget and time constraints. The DV communicates to the user (e.g., customer) whether the SLA cannot be satisfied. In the event the DV determines that the SLA may be satisfied given the customer budget and time constraints, the DV determines whether higher SLAs may be met given the customer budget and/or time constraints. For example, given the customer budget and time constraints, in the event a greater fault tolerance can be provided, the DV provides the greater fault tolerance to the user (e.g., customer) for selection. Based upon budget and time constraints, the DV calculates the data share(s) stored in various vendors' (providers) location.

Figure 4:
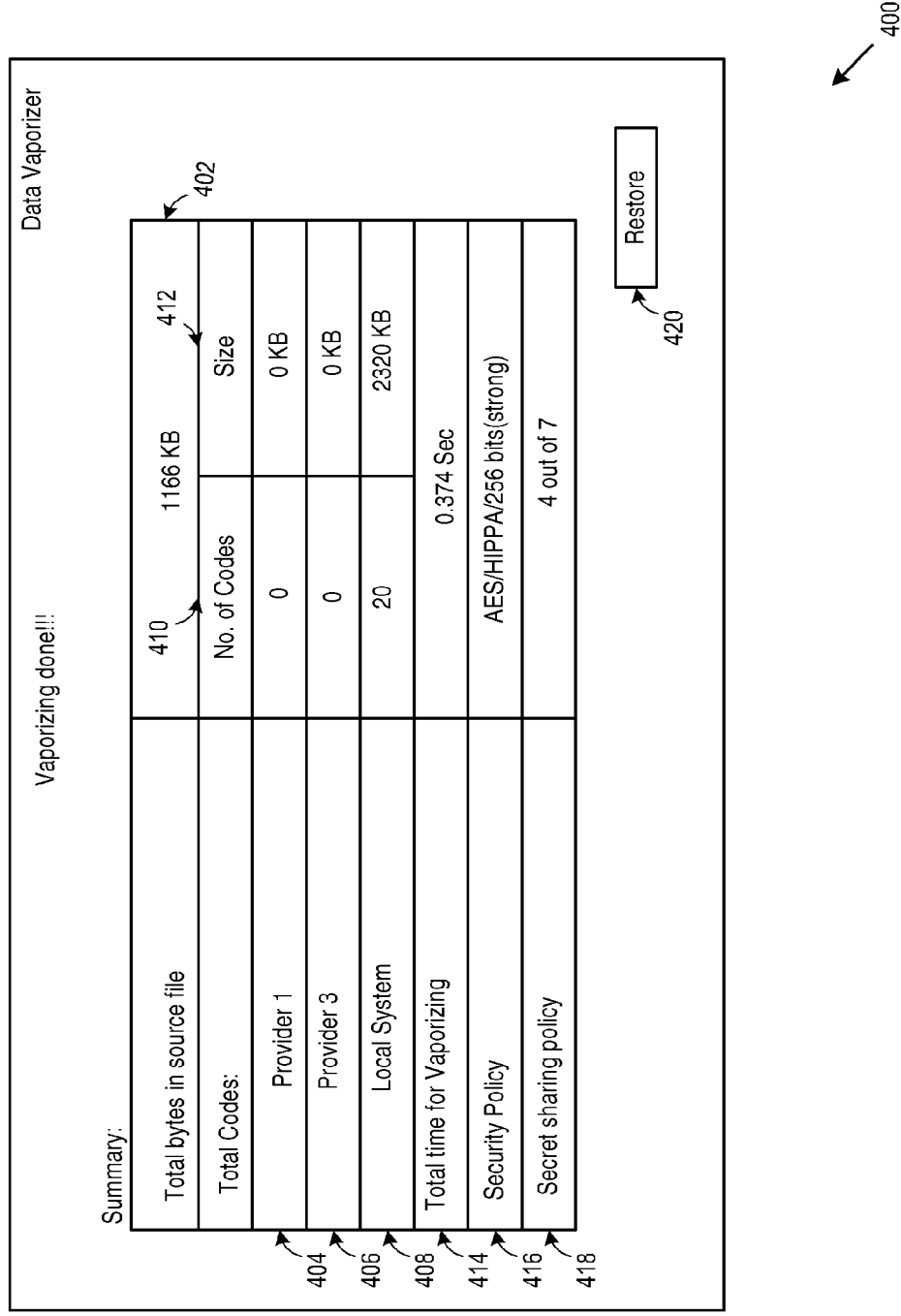
FIG. 4 illustrates an exemplary vaporizer summary display generated by the data vaporizer.

FIG. 4 illustrates an exemplary a vaporizer summary display 400 generated by the data vaporizer 102. The vaporizer summary display 400 may present the user information regarding the results of the vaporization, including: the total bytes of the source file 402; for each service provider selected (404, 406, 408) to distribute the vaporized data, the total number of codes 410 and the size 412 (e.g., amount) of the storage used to vaporize the user's (customer's) data; the total time elapsed 414 to vaporize the data; the security policy 416 applied; and the secret sharing policy 418 applied. The user may select the restore button 420 to restore a previously vaporized data, and the DV may navigate to the restore basic display 500, discussed further below.

Figure 5:
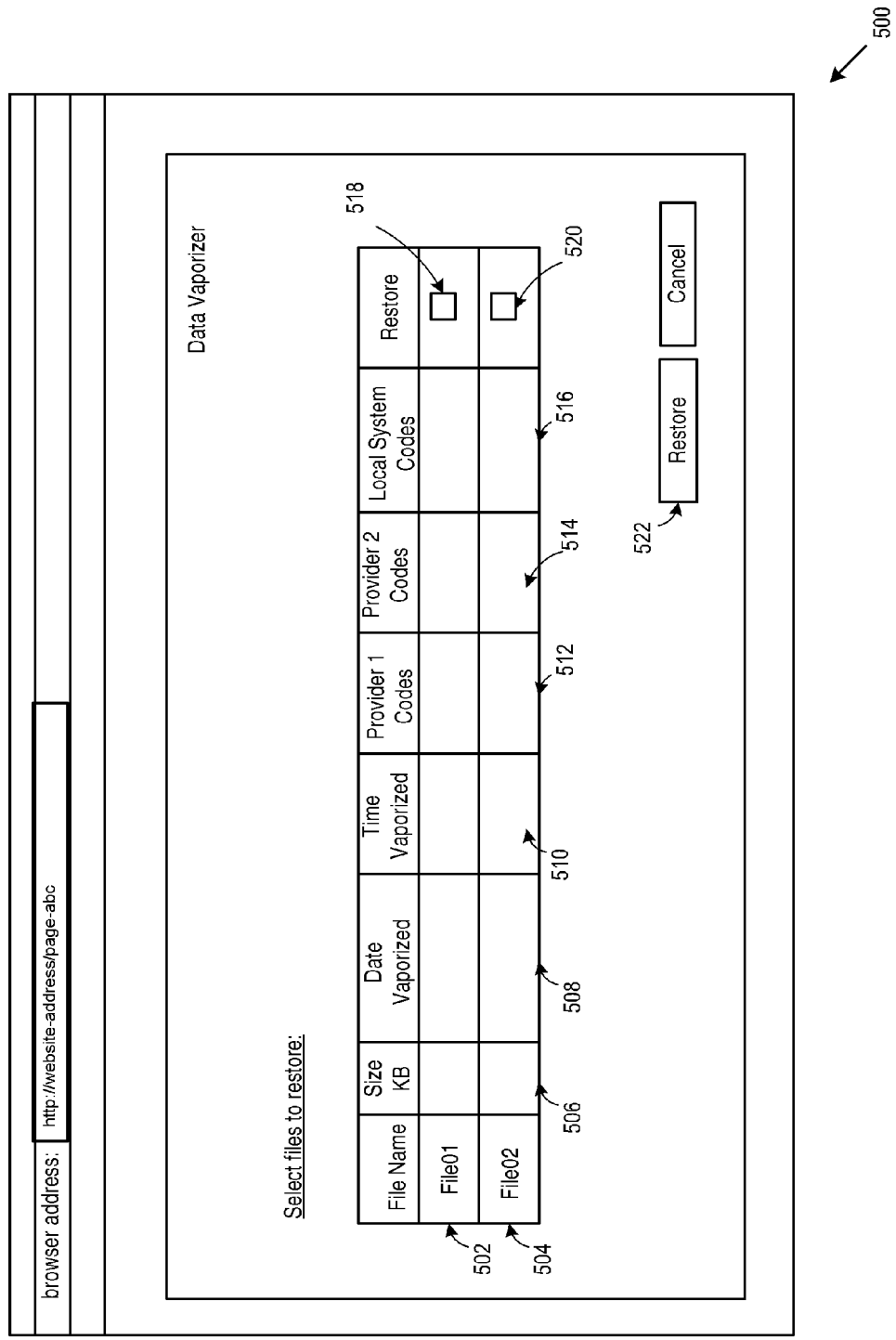
FIG. 5 illustrates an exemplary restore basic display 500 generated by the data vaporizer.

FIG. 5 illustrates an exemplary a restore basic display 500 generated by the data vaporizer 102. The restore basic display 500 may present information for the files previously vaporized and selectable for restoration (e.g., re-generation), including: the filenames (502, 504); size of the file 506; date the file was vaporized 508; the time elapsed to vaporize 510 the file; the providers and/or local system codes (512, 514, 516) used to store the vaporized data; and a restore indicator (518, 520) selectable to indicate whether to restore the file. One or more files may be selected (518, 520) for restoration simultaneously using the restore basic display 500, when the restore 522 button is selected.

Figure 6:
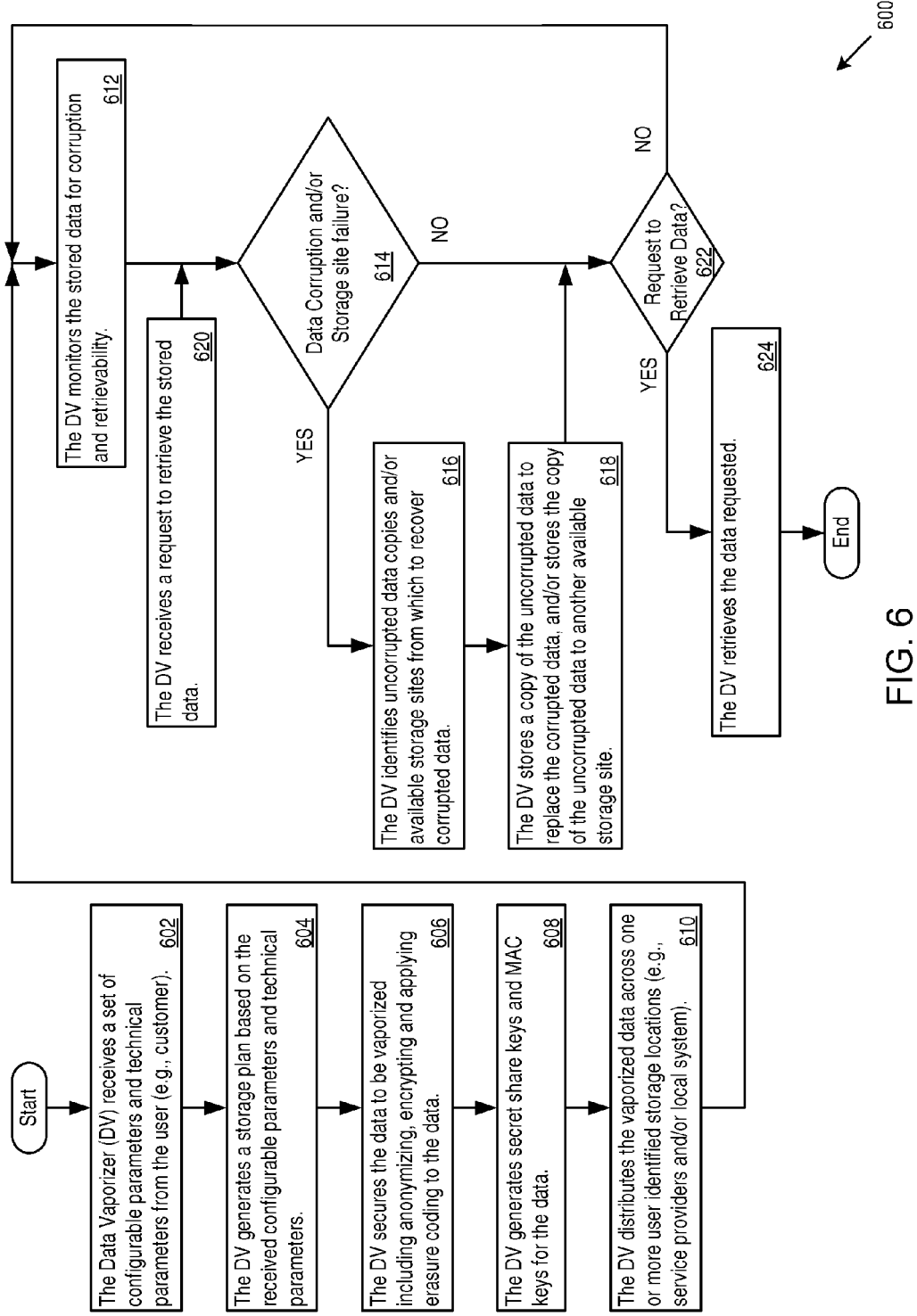
FIG. 6 is a flowchart that illustrates one embodiment of the logic instructions the data vaporizer system may execute to operate in an archival system.

FIG. 6 is a flowchart 600 that illustrates one embodiment of the logic instructions the Data Vaporizer system may execute to operate in an archival system. The Data Vaporizer may operate (e.g., in an archival system) in the following manner. The Data Vaporizer receives from the user (e.g., customer and/or administrator) a set of configurable parameters (e.g., compliance, geographic and cost constraints) and technical parameters (e.g., redundancy and cloud storage provider minimum mandatory requirements) (602). The Data Vaporizer may create (generate) a storage plan (e.g., and/or allow the user to configure) that includes one or more storage and recovery strategies to apply across the cloud (e.g., remote and local storage providers) responsive to security, cost and fault tolerance constraints (e.g., limits) (604). The Data Vaporizer secures the data to be stored so that the backup data is processed through a series of anonymization, encryption and erasure coding steps so that the coded data is ready to back-up (606). The Data Vaporizer provides additional security to ensure extra protection (e.g., by generating secret share keys and MAC keys) for the data (608). Secret share keys prevent unauthorized entities (e.g., cloud providers and/or non-owners of data) from colluding and stealing data, and the MAC keys provide detection and prevention of data integrity loss. The Data Vaporizer distributes the data across different storage locations (e.g., one or more service providers) (610). The Data Vaporizer may generate a final super-key (e.g., composite key combining the secret share keys and MAC keys) and communicate the final super-key to the user (e.g., data owner and/or customer) and/or one or more trusted third-parties.

The Data Vaporizer monitors the stored data for corruption and retrievability in order to respond to failures (e.g., different types of "attacks" and "failures") including one or more local disk failures, cloud outages, cryptographic attacks and cloud insider attacks and/or collusion between multiple providers and entities under the control of the service providers (612). In the event the DV determines data corruption and/or storage site failures (614), the DV identifies uncorrupted data copies and/or available storage sites from which to recover corrupted data (616) and stores a copy of the uncorrupted data to replace the corrupted data, and/or stores the copy of the uncorrupted data to another available storage site (618). Thus, even if multiple storage providers are unavailable (e.g., due to outage or corruption) and/or collusion is attempted between some number of storage providers (e.g., aggregating metadata such as security information necessary to retrieve the stored data), the system is able to restore corrupt data and/or prevent service provider collusions regarding stored data base on a configurable threshold parameter. The system may be configured to minimize the number of service providers (e.g., cloud storage provider) required to retrieve the data to restore corrupted data, and maximize the number of service providers needed to collude (e.g., aggregate security metadata) in order to compromise the data.

Figure 7:
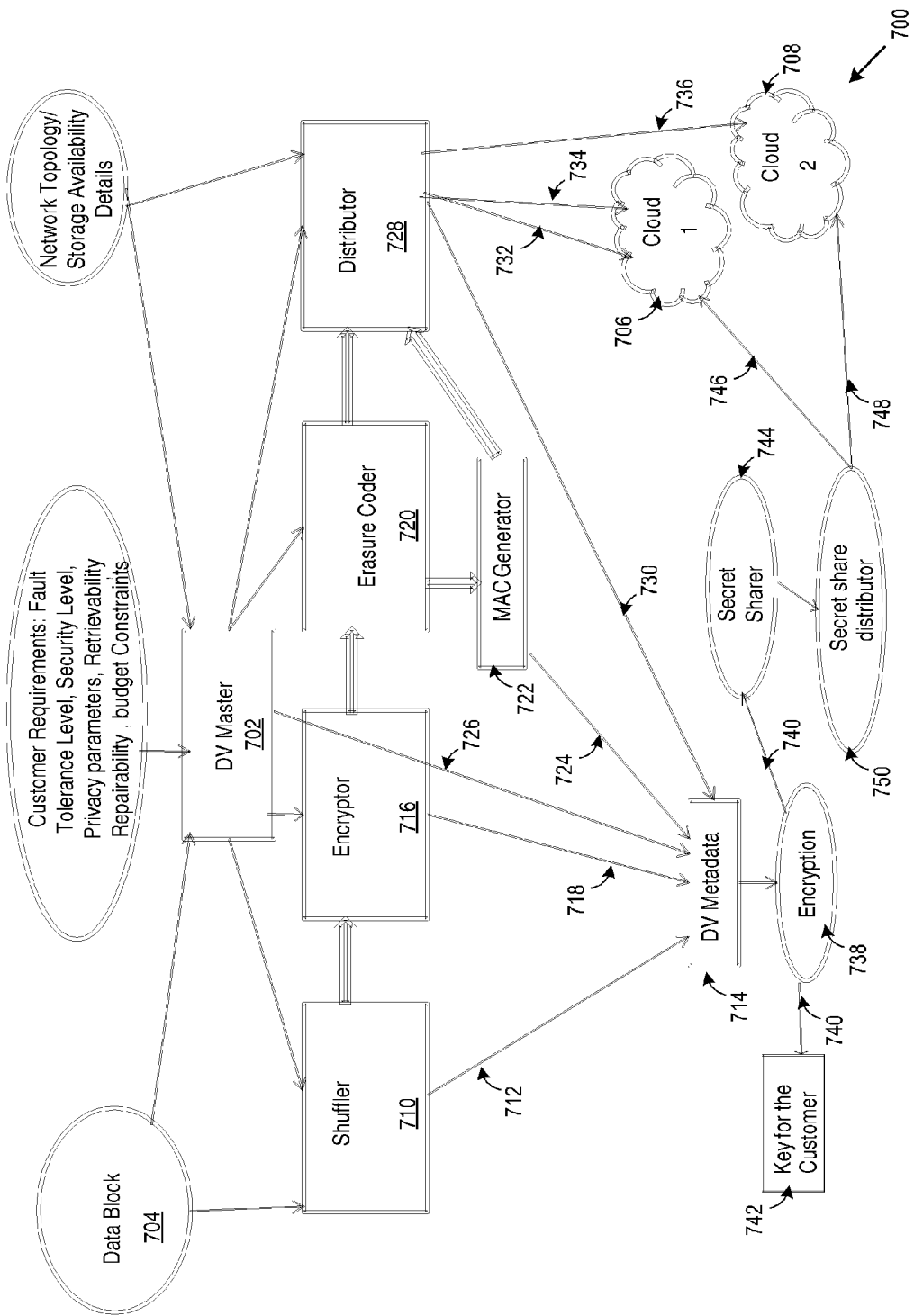
FIG. 7 is a block diagram that illustrates one embodiment of the logic and processing flow that the DV may use for data storage.

When the Data Vaporizer receives a request to retrieve the stored data (620), the DV efficiently retrieves stored data with any set of available data blocks (e.g., at a primary site and/or one or more secondary sites) (within a configurable redundancy threshold that identifies a number of locations to store the data in order to avoid a number of simultaneous storage location failures) (622, 624). The Data Vaporizer may implement elaborate metadata management processes that provide extensibility and enterprise readiness to handle primary backup and rolling back-ups (e.g., deltas). Additionally, the DV may interface with enterprise backup software to ensure efficient de-duplication FIG. 7 is a block diagram 700 that illustrates one embodiment of the logic and processing flow that the DV 702 may use for data storage. In one embodiment, the Data Vaporizer 702 prepares one or more input data blocks 704 and makes the input data blocks 704 ready for cloud storage (706, 708). The input data block 704 is passed through a data anonymization module (e.g., "Shuffler" 710) that anonymizes data fields of the input data block 704. The shuffler 710 generates a shuffle key 712 used by the DV to generate composite metadata 714. The Data Vaporizer 702 includes a data encryption module (e.g., "Encryptor" 716) to encrypt the anonymized data fields of the input data block 704 with a user configurable level of strength (e.g., key length) (e.g., number of bytes to use to generate an encryption key). In one implementation, the Data Vaporizer 702 may encrypt the data fields of the input data block 704 and pass the encrypted data fields through the data anonymization module (e.g., "Shuffler" 710), which anonymizes the encrypted data fields of the input data block 704.

The Encryptor 716 generates an encryption key 718 that the DV combines with the shuffle key 712 to generate the composite metadata 714. The Data Vaporizer 702 includes an erasure coding module (e.g., "coder" 720 that generates (creates) encoded data fragments and codes data blocks. The coder 720 and/or the DV communicate the encoded data fragments and codes data blocks to a shared secret key generator module (e.g., a "MAC generator" 722). The MAC generator 722 generates MAC keys 724 that the DV may combine with metadata about the 'structure of the data' 726, the encryption key 718 and the shuffle key 712 to generate the composite metadata 714. The Data Vaporizer 702 may also include a data distribution module (e.g., "Distributor" 728) that generates 'code distribution details' 730 and data shares (732, 734, 736), and communicates the data shares (732, 734, 736) (e.g., the encoded data fragments) to providers (706, 708) (e.g., multiple cloud storage locations) (e.g., identified by the user as a distribution plan). The DV may combine the 'code distribution details' 730 with metadata about the 'structure of the data' 726, the encryption key 718 and the shuffle key 712 to generate the composite metadata 714. The DV encrypts (e.g., using a sensitively handler encryptor 738 and/or the encryptor 716) the composite metadata 714 to generate an encrypted key 740, and communicates the encrypted key 740 to the customer (e.g., user) 742.

The data shuffler 710 module provides users a way to configure the type of anonymization and granularity of the data to be anonymized. Based on regulatory (e.g., digital) data storage requirements (e.g., laws and/or industry compliance standards), the data shuffler anonymizes the data to be stored by removing, shuffling and aggregating personally identifiable data fields from the records. The anonymization and privacy requirements for data storage may be the same or different for users of different industries. The common compliance standards may include Gramm-Leach-Bliley Act (GLBA), Health Insurance Portability and Accountability Act (HIPAA) (for healthcare), and Sarbanes-Oxley Act (SOX), Payment Card Industry Data Security Standard (PCI-DSS) (credit card industry). The data shuffler module shuffles the bits in the records of the data to be store so that no relations between data may be established. The Data Vaporizer and/or the data shuffler module may delete (and/or further fragment and/or store the data in another location) "sensitive" fields of the data to be anonymized.

The Data Encryptor 716 encrypts the data to ensure data security and integrity in the cloud. Depending on the strength and type (e.g., level) of encryption required, the DV may use standard Data Encryption Standard (DES) or Advanced Encryption Standard (AES) encryption schemes with varying key strengths.

The Coder 720 (erasure/error correction (EC) coding) provides fault-tolerance. The erasure coding may be implemented as an MDS (maximum distance separable) coding which encodes m data blocks to n erasure encoded blocks where n>m and the ratio r=m/n is called a coding ratio. In order to decode and regenerate the original file, the Data Vaporizer may use any of m coded blocks. The Data Vaporizer may also use regenerative coding which is a variation of MDS coding where either storage requirement or bandwidth requirement for regeneration (or both) may be configured for optimization. DV may use the Erasure Coding and/or regenerative Coding to fragment, encode and distribute data.

The Message Authentication Code is a signature scheme, and may use a symmetric key mechanism (e.g., same private-public key). The DV and/or MAC generator 722 generates a MAC value (e.g., key or Tag) 724 for each encoded block with a secret key. If a block becomes corrupt (and/or maliciously attacked), a suitably modified MAC cannot be created without the private key. MAC encoding provides integrity to each EC (erasure/error correction (EC))] coded block in a cloud share (storage shares).

The distributor 728 module computes the shares (e.g., the number of data blocks) to be stored with each of the cloud storage providers (e.g., cloud service providers). The Data Vaporizer and/or the distributor module may create a distribution schedule based on a combination of configurable parameters (e.g., storage cost, a level of fault-tolerance required, geographic affinity, regulatory provisions, and/or network bandwidth requirement). The distributor module pushes out the shares to the storage providers by using application program interfaces (API) for each provider.

The Data Vaporizer and/or a secret sharer 744 uses the encrypted key 740 to generate secret shares (e.g., share keys) (746, 748). The Data Vaporizer may communicate the secret shares (e.g., share keys) (746, 748) using a secret share distributor 750 to distribute the secret shares (e.g., share keys) (746, 748) to the cloud storage (706, 708). The Data Vaporizer generates metadata by concatenating and further encrypting the keys and metadata obtained from the Shuffler 710, Encryptor 716, EC coder 720, MAC generator 722, DV Master 702 (DV) and share generator (Distributor 728). The metadata may be securely stored privately and/or with the client and/or shared with trusted third-parties (e.g., cloud service providers, the data owner, agents of the data owner) using a secret sharing mechanism (e.g. Shamir's secret sharing algorithm).

The Shamir's secret sharing algorithm ensures that in order to re-generate the super-key the metadata stored with at least t+1 parties must be aggregated. The Shamir's secret sharing algorithm provides a way to divide some data D (e.g., the safe combination) into n pieces $D_1, \ldots D_n$ in such a way that knowledge of any k or more $D_i$ pieces makes D easily computable; and knowledge of any k−1 or fewer $D_i$ pieces leaves D completely undetermined (in the sense that all of the possible values for D are equally likely). This scheme is called (k, n) threshold scheme. If k=n then all participants are required to reconstruct the secret.

Figure 8:
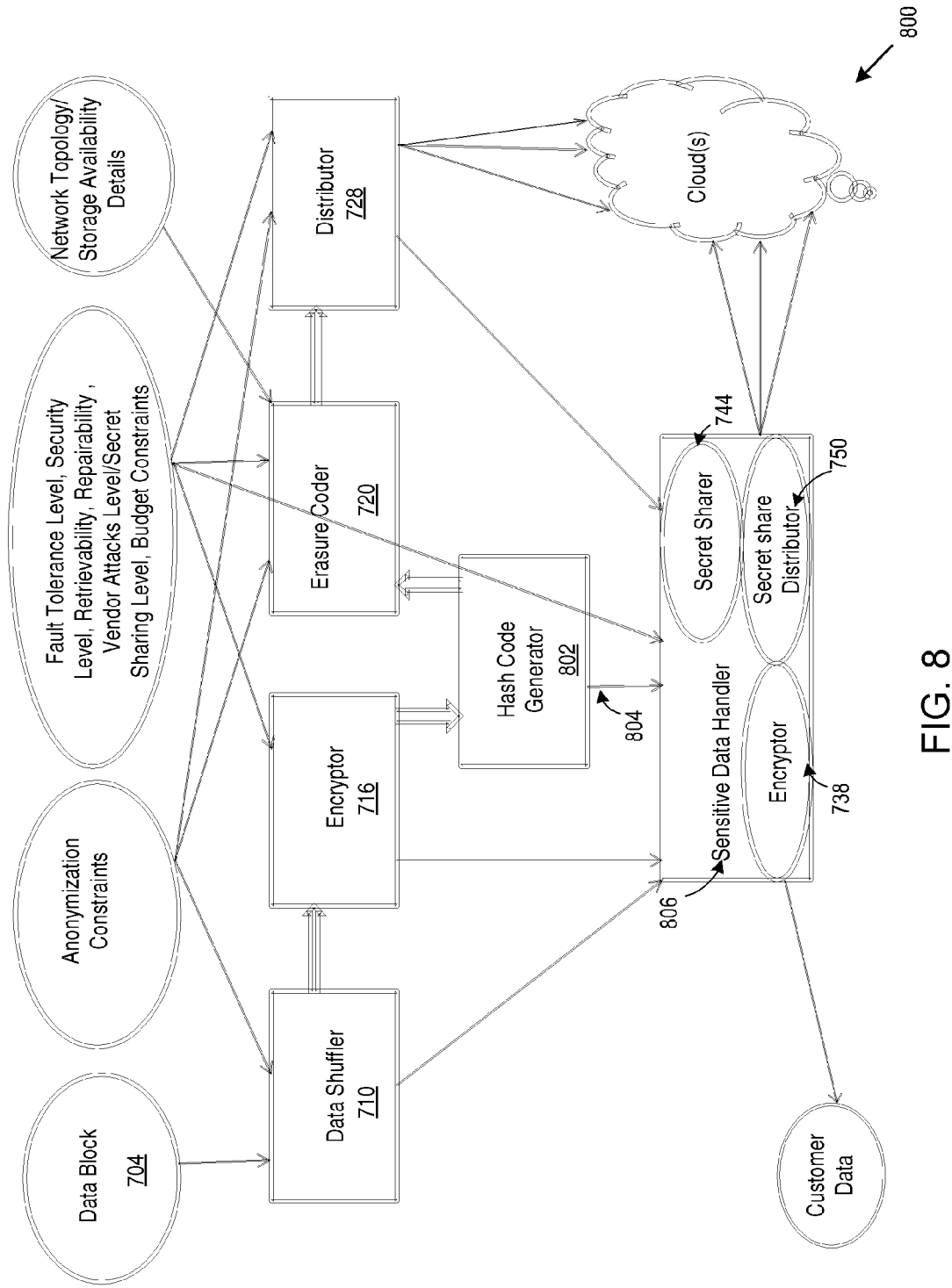
FIG. 8 is another block diagram that illustrates one embodiment of the logic and processing flow that the DV may use for data storage.

FIG. 8 is another block diagram 800 that illustrates one embodiment of the logic and processing flow that the DV may use for data storage. In one implementation, the DV may use a hash code generator 802 in communication with the Encryptor 716 and the coder 720. The hash code generator 802 generates hash codes 804 (for each data block) from the anonymized data fields of the input data block 704. The hash code generator 802 may communicate the hash codes 804 to a sensitively handler 806 that processes the hash codes 804 as sensitive data. The sensitively handler 806 includes a sensitively handler encryptor 738, the secret sharer 744 and the secret share distributor 750 used to further process and/or manage the hash codes 804.

Figure 9:
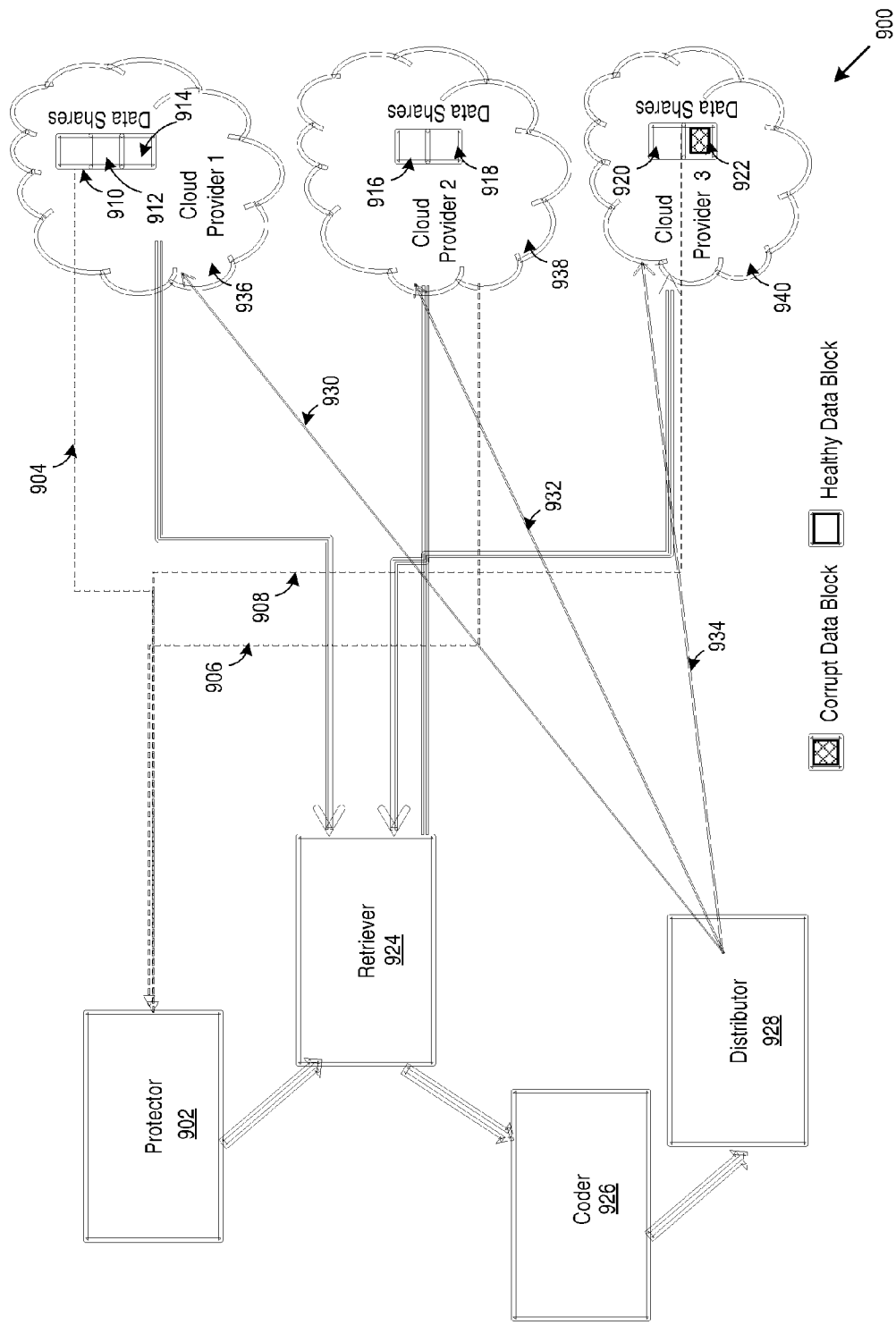
FIG. 9 is another block diagram that illustrates one embodiment of the logic and processing flow that the DV may use for data protection.

FIG. 9 illustrates one embodiment of a DV schematic flow diagram 900 the DV may use to ensure data integrity and retrievability of stored data. The Protector 902 "sniffs" (e.g., interrogates) (904, 906, 908) data shares (cloud shares) (910, 912, 914, 916, 918, 920, 922) to identify corrupt blocks 922 of stored data by performing a corrupt or modified block MAC check. The data shares (910, 912, 914, 916, 918, 920, 922) may include the distributed coded chunks and secret shares distributed to the providers for storage. In the event, the corrupt or modified block MAC check fails, the protector 902 alerts the retriever 924 module and determines which one or more data shares to retrieve. The data Protector module protects the stored data against local disk faults and/or corruption (also called bit-rot), as well as against malicious attack on the data blocks. The protector may use a "Mark-Sweep" model to "sniff" random shares (e.g., check MAC tags with private keys for authentication) to mark corrupted shares (cloud shares), and record the corrupt blocks and apply one or more suitable strategies to retrieve and regenerate (e.g., repair) the corrupted shares. The Data Vaporizer uses m blocks (out of n) to regenerate data. The Data Vaporizer may also use regenerative codes [n, k, d] to determine a strategy to apply to recover the data from k of n nodes and a failed node may be reconstructed by retrieving information from (e.g., communicating with) d nodes.

The retriever 924 receives (and/or retrieves) the secret share details, decrypts the "super-key" and retrieves the shares. The Retriever performs the reverse operation of the Distributer. The Retriever collects the data shares from different cloud providers (by retrieving the metadata), and the Data Vaporizer and/or retriever communicate (pass) the blocks to the erasure decoder (e.g., the encryptor may operate in a decoder mode to perform as a decoder), Decryptor and De-anonymizer functions. The retriever 904 communicates the coded blocks to the coder 926 module (decoder or coder operating in a decoder mode), which decodes the blocks and recodes the blocks (922) with new parameters. The distributor 928 generates (e.g., creates) new data shares (e.g., for the corrupted or modified cloud shares) and distributes (930, 932, 934) the new data shares to multiple storage locations (e.g., one or more cloud service providers—936, 938, 940).

Figure 10:
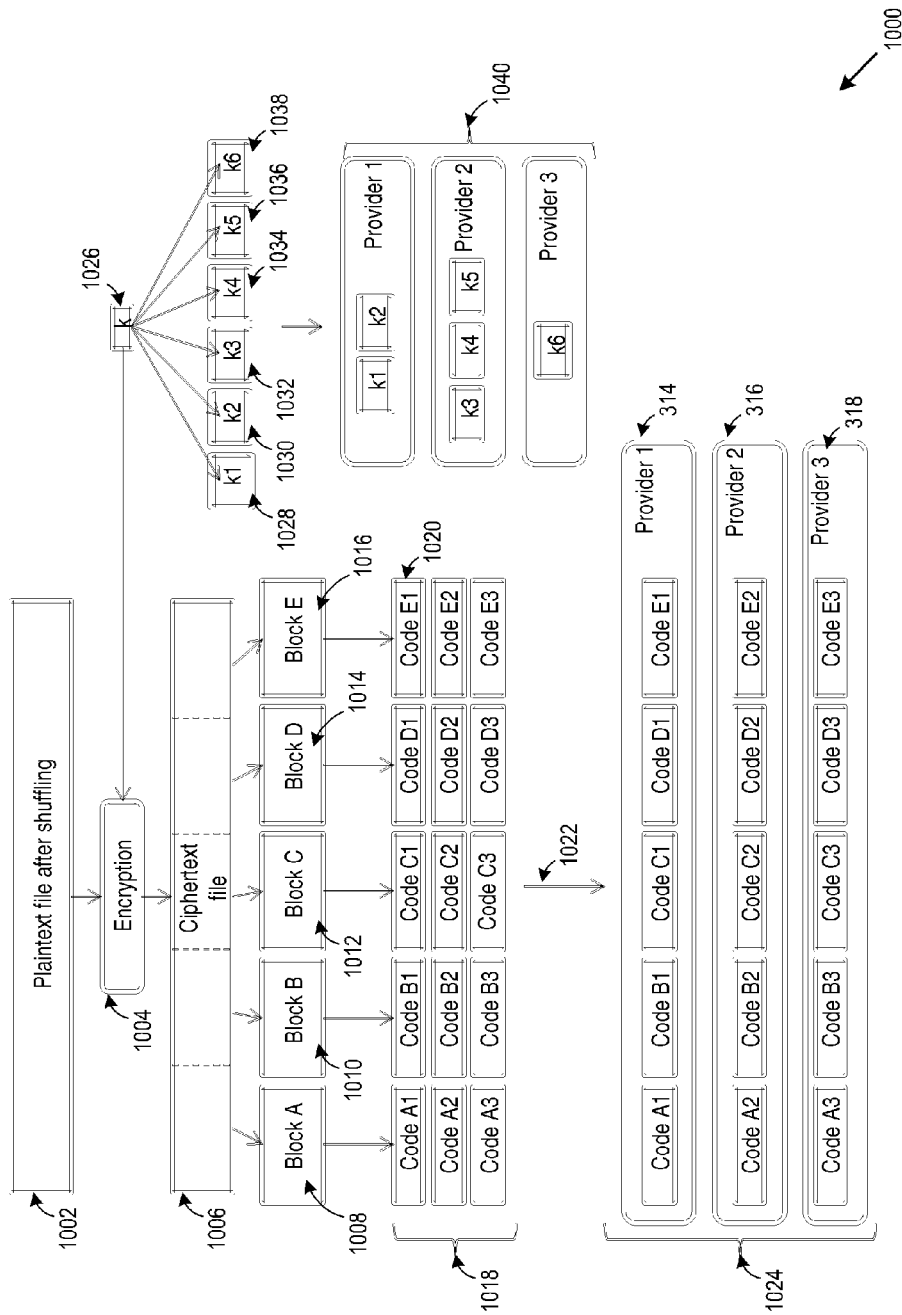
FIG. 10 is a block diagram that illustrates one embodiment of the logic and processing flow that the DV may use to vaporize data.

FIG. 10 is a block diagram 1000 that illustrates one embodiment of the logic and processing flow that the DV may use to vaporize data (e.g., a plaintext file 1002). For example, after shuffling (anonymizing) a plaintext file 1002, the DV and/or the encryptor encrypts the anonymized plaintext file 1002 (1004) using a cipher (e.g., a key of a configurable length in bytes to encrypt and decrypt a ciphertext file) to generate a ciphertext file 1006 divided into a configurable number of blocks (ciphertext data blocks) (1008, 1010, 1012, 1014, 1016) of encrypted data. The DV and/or the EC coder apply erasure coding (e.g., using the Reed-Solomon coding algorithm) to generate coded chunks 1018 (e.g., code E1 1020 is a portion of block E of x number of bytes) of the blocks of the ciphertext file. The DV and/or the distributor distribute (vaporizes 1022) the coded chunks 1018 (as Distributed Cloud codes 1024) to a configurable number of cloud storage providers (314, 316, 318). The DV and/or the secret sharer module (component) use Shamir sharing to generate a configurable number of secret shares k (1028, 1030, 1032, 1034, 1036, 1038) that the DV and/or the secret sharer distributor distribute the secret shares to cloud shares 1040 distributed among the providers (314, 316, 318).

Figure 11:
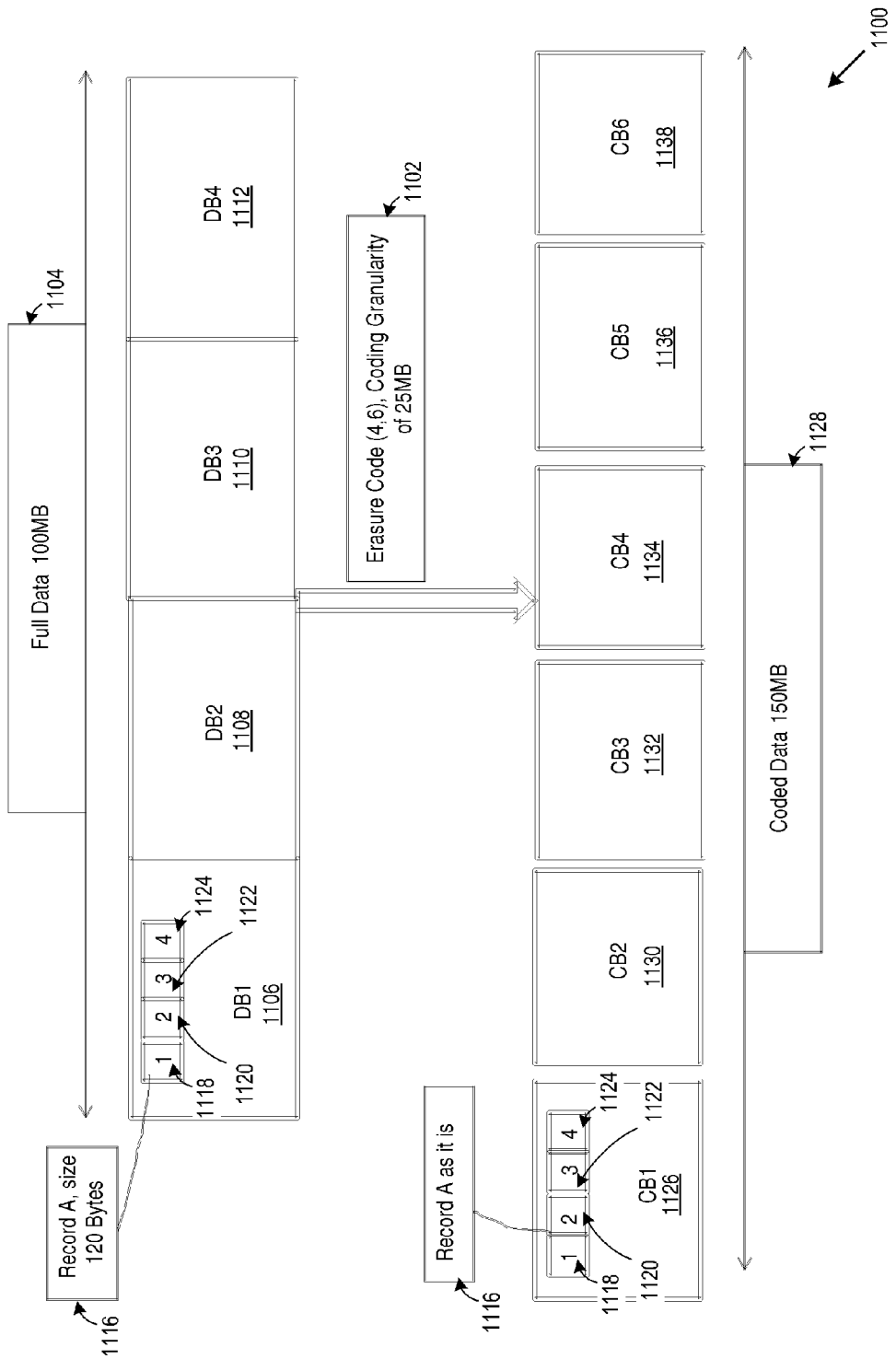
FIG. 11 is a block diagram that illustrates one embodiment of traditional erasure coding.

FIG. 11 is a block diagram 1100 that illustrates one embodiment of a traditional erasure coding. Traditional erasure coding may perform an erasure coding 1102 (e.g., using a ratio of 4/6 and a coding granularity of 25 MB) to store a file 1104 (data) stored across multiple data blocks (1106, 1108, 1110, 1112) where each data block (1106, 1108, 1110, 1112) includes one or more data records 1116 comprising multiple fragments of data (1118, 1120, 1122, 1124). Traditional erasure coding stores the entire data record 1116 of multiple fragments of data (1118, 1120, 1122, 1124) to a single coded block 1126. Traditional erasure coding may result in 150 MB of coded data 1128 as result of coding a file 1104 of 100 MB.

Figure 12:
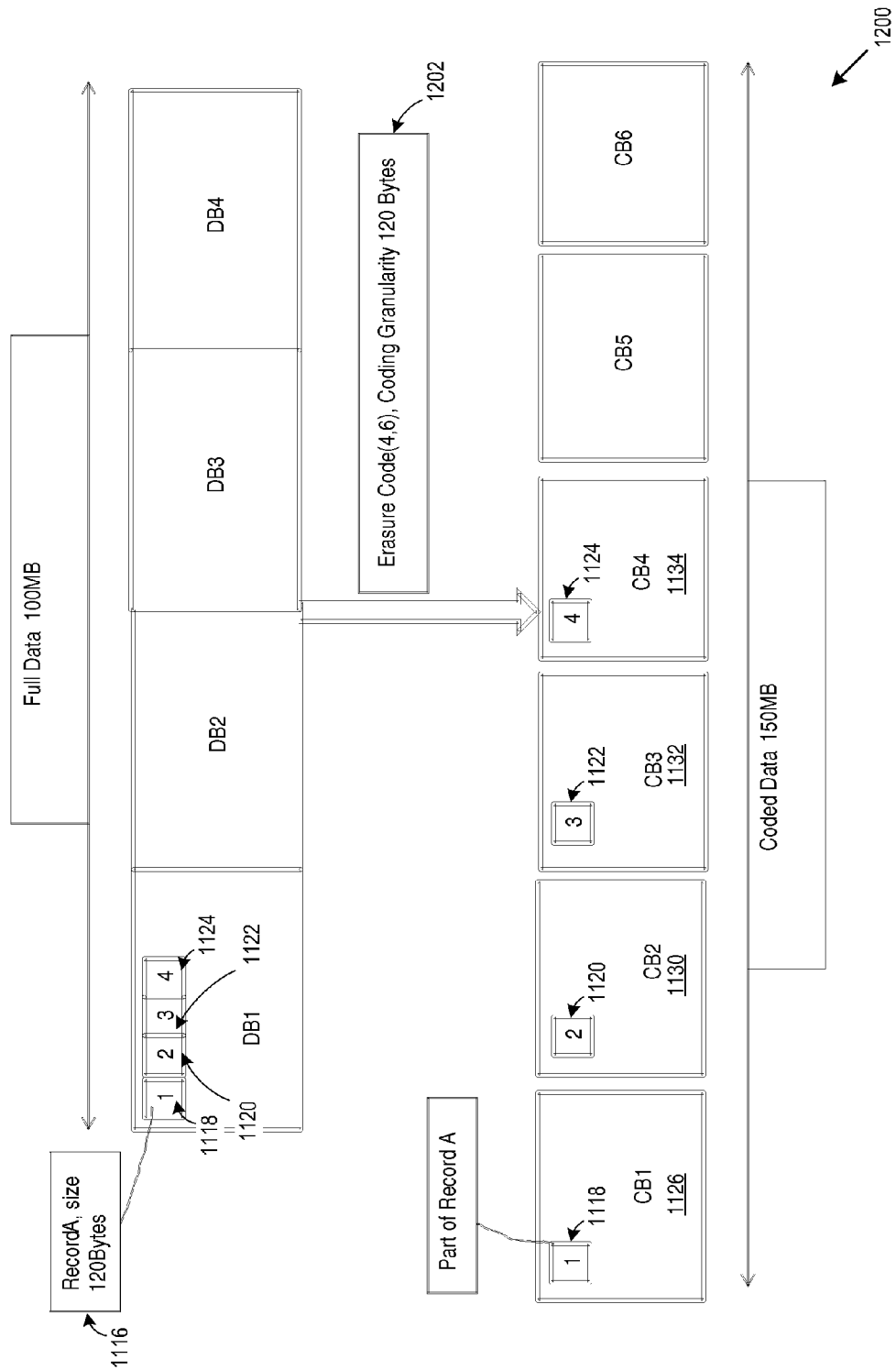
FIG. 12 is a block diagram that illustrates one embodiment of the DV erasure coding for anonymization.

FIG. 12 is a block 1200 diagram that illustrates one embodiment of the DV erasure coding 1202 for anonymization, in contrast to traditional erasure coding. The DV erasure coding 1202 for anonymization stores the multiple fragments of data (1118, 1120, 1122, 1124) of data record 1116 to separate coded blocks (1126, 1130, 1132, 1134).

FIG. 13 illustrates an exemplary a DV data distribution chart 1300 that identifies a number of clouds per storage zones 1302 usable to ensure a tolerance level 1304. The Data Vaporizer may use an erasure coding (EC) technique to provide a comparable (e.g., same or similar) degree of geographic protection with a smaller data footprint than required when using replication to store data. The Data Vaporizer may use less expensive storage (e.g., Amazon® Glacier or other cloud storage) to reduce storage costs. For example, the DV data distribution chart 1300 illustrates a minimum data footprint 1306 required to protect 100 GB of stored data from simultaneous (e.g., concurrent) failures 1308 by multiple cloud providers and/or sites to provide full data replication across sites (e.g., file fragment size=20 GB, m=5 cloud service providers). The DV data distribution chart 1300 illustrates the number of clouds 1310 per storage zones 1312, where each storage zone 1314 may be identified to include replication or DV (EC).

Figure 14:
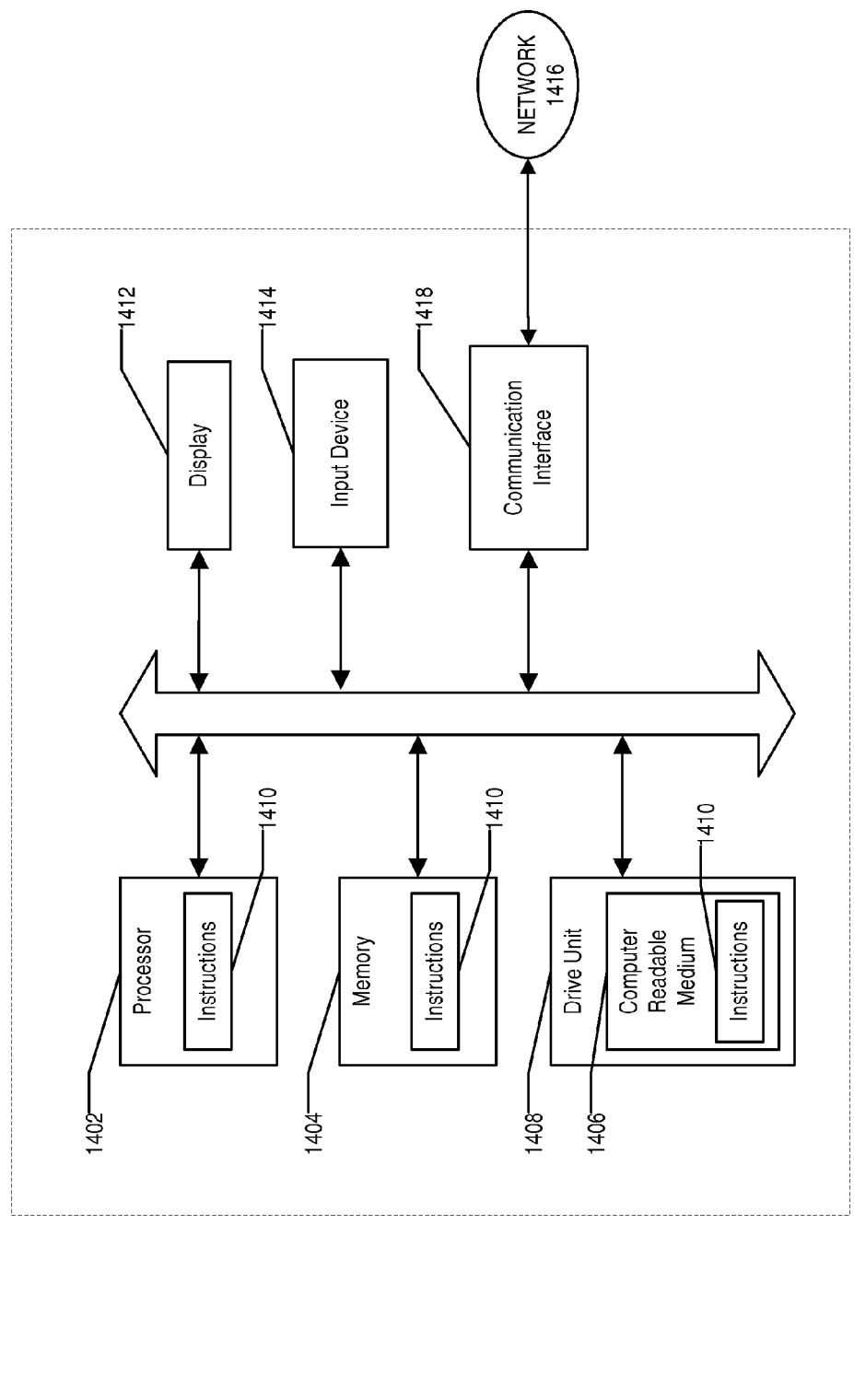
FIG. 14 illustrates one embodiment of a general computer system that may be used to implement the DV system

FIG. 14 illustrates one embodiment of a general computer system 1400, which may represent a service provider server, or any of the other computing devices referenced herein that may be used to provide the system and methods. The computer system 1400 may include a set of instructions 1410 that may be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1410 (sequential or otherwise) that specify actions to be taken by that machine. In a particular embodiment, the computer system 1400 may be implemented using electronic devices that provide voice, video or data communication. Further, while a single computer system 1400 may be illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, such as, a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus. The memory 1404 may be a main memory, a static memory, or a dynamic memory. The memory 1404 may include, but may not be limited to computer readable storage media (e.g., a non-transitory memory) such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1404 may include a cache or random access memory for the processor 1402. Alternatively or in addition, the memory 1404 may be separate from the processor 1402, such as a cache memory of a processor, the system memory, or other memory. The memory 1404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1404 may be operable to store instructions 1410 executable by the processor 1402. The functions, acts or tasks illustrated in the figures or described herein may be performed by the programmed processor 1402 executing the instructions 1410 stored in the memory 1404. The functions, acts or tasks may be independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The computer system 1400 may further include a display 1412, such as a liquid crystal display (LCD), an organic light emitting diode (OLED), a flat panel display, a solid state display, a cathode ray tube (CRT), a projector, a printer or other now known or later developed display device for outputting determined information. The display 1412 may act as an interface for the user to see the functioning of the processor 1402, or specifically as an interface with the software stored in the memory 1404 or in the drive unit 1408.

Additionally, the computer system 1400 may include an input device 1414 configured to allow a user to interact with any of the components of system 1400. The input device 1414 may be a number pad, a keyboard, or a cursor control device, such as a mouse, or a joystick, touch screen display, remote control or any other device operative to interact with the system 1400.

The computer system 1400 may also include a disk or optical drive unit 1408. The disk drive unit 1406 may include a computer-readable medium 1406 in which one or more sets of instructions 1410, e.g. software, can be embedded. Further, the instructions 1410 may perform one or more of the methods or logic as described herein. The instructions 1410 may reside completely, or at least partially, within the memory 1404 and/or within the processor 1402 during execution by the computer system 1400. The memory 1404 and the processor 1402 also may include computer-readable media as discussed above.

The present disclosure contemplates a computer-readable medium 1406 that includes instructions 1410 or receives and executes instructions 1410 responsive to a propagated signal; so that a device connected to a network 1416 may communicate voice, video, audio, images or any other data over the network 1416. Further, the instructions 1410 may be transmitted or received over the network 1416 via a communication interface 1418. The communication interface 1418 may be a part of the processor 1402 or may be a separate component. The communication interface 1418 may be created in software or may be a physical connection in hardware. The communication interface 1418 may be configured to connect with a network, external media, the display 1412, or any other components in system 1400, or combinations thereof. The connection with the network 1416 may be a physical connection, such as a wired Ethernet connection or may be established wirelessly as discussed below. Likewise, the additional connections with other components of the system 1400 may be physical connections or may be established wirelessly.

The network 1416 may include wired networks, wireless networks, or combinations thereof. The wireless network may be a cellular telephone network, an 802.11, 802.16, 802.20, or WiMax network. Further, the network 1416 may be a public network, such as the Internet, a private network, such as an intranet, or combinations thereof, and may utilize a variety of networking protocols now available or later developed including, but not limited to TCP/IP based networking protocols.

The computer-readable medium 1406 may be a single medium, or the computer-readable medium 1406 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1406 may include a solid-state memory such as a memory card or other package that houses one or more non-volatile read-only memories. The computer-readable medium 1406 also may be a random access memory or other volatile re-writable memory. Additionally, the computer-readable medium 1406 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A system for the distributed storage of electronic data, the system comprising:
   a communications interface and a non-transitory memory coupled with a processor;
   the communications interface configured to receive input data blocks and user storage constraints from a user;
   the memory having stored thereon:
      one or more input data blocks comprising data fields;
      the user storage constraints; and
      processor executable instructions that when executed by the processor comprise:
   a shuffler configured to: anonymize the data fields of each of the one or more input data blocks;
   an encryptor configured to: generate a cipher key and encrypt, using the cipher key, the anonymized data fields based on the user storage constraints to obtain a ciphertext file comprising ciphertext data blocks;
   an erasure coder configured to: generate coded chunks from the ciphertext data blocks and erasure coding details;
   a distributor configured to:
      distribute the coded chunks to a first set of two or more storage providers based on the user storage constraints; and
      generate distribution details for the distributed coded chunks;
   a metadata generator configured to:
      generate secret shares of metadata for each of the coded chunks, wherein the secret shares of metadata includes decoding information for decoding each respective coded chunk including at least the cipher key;
   a secret sharer configured to:
      generate secret share keys for decoding the secret shares of metadata;
      generate a secret sharing ratio X/Y that indicates a number of X storage providers out of Y storage providers used to reconstruct the secret shares of metadata; and
      distribute fragments of the secret shares of metadata across a second set of two or more storage providers, wherein the fragments of the secret shares of metadata are distributed to the second set of two or more storage providers separately from corresponding coded chunks; and
   a secret sharer distributor configured to:
      distribute the secret share keys across a third set of two or more storage providers, wherein the secret share keys are distributed to the third set of two or more storage providers separately from corresponding coded chunks.

2. The system of claim 1, wherein the encryptor is further configured to: generate an encryption key for the ciphertext file, wherein the encryption key comprises: a shuffle key, the cipher key, the erasure coding details, and the distribution details;
   wherein the communications interface communicates the encryption key to the user.

3. The system of claim 2, wherein the distributed coded chunks and the secret shares of metadata stored together at each of the storage providers are identified as storage shares.

4. The system of claim 3, wherein the user storage constraints comprise:
   a customer type that identifies an industry of the user and a type of data from which the input data blocks are comprised;
   a domain compliance for the industry of the user that identifies a type of data compliance, the type of data compliance comprising HIPAA, financial, or multimedia;
   a fault tolerance threshold;
   a security type, or a security threshold, or both;
   a retrievability threshold that identifies a probability of retrieving stored data blocks;
   a repairability threshold that identifies a probability of repairing stored data blocks;
   a simultaneous provider attacks threshold that identifies a subset of the number of the storage providers required to aggregate the storage shares to re-generate the encryption key communicated to the user; or
   budget for storage and retrieval of the input data blocks; or any combination thereof.

5. The system of claim 3, wherein the executable instructions further comprise:
   a protector; a retriever; and a decoder.

6. The system of claim 5, wherein the protector is configured to:
   interrogate the storage shares by executing a corrupt or modified block check to test the retrievability of the distributed coded chunks and secret shares of metadata of the storage shares;
   mark the distributed coded chunks and secret shares of metadata that fail the corrupt or modified block check; and
   communicate the distributed coded chunks and secret shares of metadata that fail the corrupt or modified block check to the retriever.

7. The system of claim 6, wherein the retriever is configured to:
   retrieve a number of uncorrupted data shares from the storage providers;
   re-generate the encryption key from the secret shares of metadata of the uncorrupted data shares;
   retrieve, using the re-generated encryption key, uncorrupted distributed coded chunks from the storage providers;
   communicate the retrieved uncorrupted distributed coded chunks to the decoder.

8. The system of claim 7, wherein the decoder is configured to:
   decode the retrieved uncorrupted distributed coded chunks to obtain the data fields of the input data blocks for the corrupted distributed coded chunks;
   re-code the data fields of the input data blocks for the corrupted distributed coded chunks;
   communicate re-coded chunks to the distributor to distribute the re-coded chunks to the storage providers based on the user storage constraints; and generate distribution details for the distributed re-coded chunks.

9. A method for the distributed storage of electronic data comprising:
   receiving into a non-transitory memory coupled with a processor, using a communications interface:
      one or more input data blocks comprising data fields;
      user storage constraints;
   anonymizing the data fields of each of the one or more input data blocks;
   generating a cipher key;
   encrypting, using the cipher key, the anonymized data fields based on the user storage constraints to obtain a ciphertext file comprising ciphertext data blocks;
   generating coded chunks from the ciphertext data blocks and erasure coding details;
   distributing the coded chunks to a first set of two or more storage providers based on the user storage constraints;
   generating distribution details for the distributed coded chunks;
   generating, by a metadata generator, secret shares of metadata for each of the coded chunks, wherein the secret shares of metadata includes decoding information for decoding each respective coded chunk including at least the cipher key;
   generating, by a secret sharer, secret share keys for the secret shares of metadata;
   generating, by the secret sharer, a secret sharing ratio X/Y that indicates a number of X storage providers out of Y storage providers used to reconstruct the secret shares of metadata;
   distributing, by the secret sharer, fragments of the secret shares of metadata across a second set of two or more storage providers, wherein the fragments of the secret shares of metadata are distributed to the second set of two or more storage providers separately from corresponding coded chunks; and
   distributing the secret share keys across the two or more storage providers, wherein the secret share keys are distributed to the third set of two or more storage providers separately from corresponding coded chunks.

10. The method of claim 9, further comprising:
    generating an encryption key for the ciphertext file from a shuffle key, the cipher key, the erasure coding details, and the distribution details;
    communicating, the communications interface, the encryption key to the user.

11. The method of claim 10, further comprising:
    distributing the secret shares of metadata to the storage providers, where the distributed coded chunks and the secret shares of metadata stored together at each of the storage providers are identified as storage shares.

12. The method of claim 11, wherein the user storage constraints comprise:
    a customer type that identifies an industry of the user and a type of data from which the input data blocks are comprised;
    a domain compliance for the industry of the user that identifies a type of data compliance, the type of data compliance comprising HIPAA, financial, or multimedia;
    a fault tolerance threshold;
    a security type, or a security threshold, or both;
    a retrievability threshold that identifies a probability of retrieving stored data blocks; a repairability threshold that identifies a probability of repairing stored data blocks;
    simultaneous provider attacks threshold that identifies a subset of the number of the providers required to aggregate the storage shares to re-generate the encryption key communicated to the user; and
    budget for storage and retrieval of the input data blocks.

13. The method of claim 11, further comprising:
    interrogating the storage shares by executing a corrupt or modified block check to test the retrievability of the distributed coded chunks and secret shares of the storage shares;
    marking the distributed coded chunks and secret shares that fail the corrupt or modified block check.

14. The method of claim 13, further comprising:
    retrieving a number of uncorrupted data shares from the storage providers;
    re-generating the encryption key from the secret shares of the uncorrupted data shares;
    retrieving, using the re-generated encryption key, uncorrupted distributed coded chunks from the storage providers.

15. The method of claim 14, further comprising:
    decoding the retrieved uncorrupted distributed coded chunks to obtain the data fields of the input data blocks for the corrupted distributed coded chunks;
    re-coding the data fields of the input data blocks for the corrupted distributed coded chunks;
    distributing re-coded chunks to the storage providers based on the user storage constraints; and
    generating distribution details for the distributed re-coded chunks;
    generating a new encryption key for the ciphertext file from the shuffle key, the cipher, the erasure coding details, and the distribution details for the distributed re-coded chunks;
    generating a new set of secret shares and new secret share keys from the new encryption key;
    distributing the secret shares to the storage providers; and
    communicating the new encryption key to the user.

16. A product comprising:
    a non-transitory computer readable medium with processor executable instructions stored thereon, wherein the instructions when executed by the processor cause the processor to:
    receive, using a communications interface:
       one or more input data blocks comprising data fields;
       user storage constraints;
    anonymize the data fields of each the one or more input data blocks;
    generate a cipher key and encrypt, using the cipher key, the anonymized data fields based on the user storage constraints to obtain a ciphertext file comprising ciphertext data blocks;
    generate coded chunks from the ciphertext data blocks and erasure coding details;
    distribute the coded chunks to a first set of two or more storage providers based on the user storage constraints; and generate distribution details for the distributed coded chunks;

generate secret shares of metadata for each of the coded chunks, wherein the secret shares of metadata includes decoding information for decoding each respective coded chunk including at least the cipher key;

generate, by a secret sharer, secret share keys for decoding the secret shares of metadata;

generate a secret sharing ratio X/Y that indicates a number of X storage providers out of Y storage providers used to reconstruct the secret shares of metadata;

distribute fragments of the secret shares of metadata across a second set of two or more storage providers, wherein the fragments of the secret shares of metadata are distributed to the second set of two or more storage providers separately from corresponding coded chunks; and distribute the secret share keys across the two or more storage providers, wherein the secret share keys are distributed to the third set of two or more storage providers separately from corresponding coded chunks.

17. The product of claim 16, wherein the instructions further cause the processor to: generate an encryption key for the ciphertext file from a shuffle key, the cipher key, the erasure coding details, and the distribution details;

wherein the communications interface communicates the encryption key to the user.

18. The product of claim 17, wherein the distributed coded chunks and the secret shares of metadata stored together at each of the storage providers are identified as storage shares.

19. The product of claim 18, wherein the user storage constraints comprise:

a customer type that identities an industry of the user and a type of data from which the input data blocks are comprised;

a domain compliance for the industry of the user that identifies a type of data compliance, the type of data compliance comprising HIPAA, financial, or multimedia;

a fault tolerance threshold;

a security type, or a security threshold, or both;

a retrievability threshold that identifies a probability of retrieving stored data blocks;

a repairability threshold that identifies a probability of repairing stored data blocks;

simultaneous provider attacks threshold that identifies a subset of the number of the providers required to aggregate the storage shares to re-generate the encryption key communicated to the user; and budget for storage and retrieval of the input data blocks.

20. The product of claim 18, wherein the instructions further cause the processor to:

interrogate the storage shares by executing a corrupt or modified block check to test the retrievability of the distributed coded chunks and secret shares of metadata of the storage shares;

mark the distributed coded chunks and secret shares of metadata that fail the corrupt or modified block check.

21. The product of claim 20, wherein the instructions further cause the processor to:

retrieve a number of the uncorrupted data shares from the storage providers;

re-generate the encryption key from the secret shares of metadata of the uncorrupted data shares;

retrieve, using the re-generated encryption key, the uncorrupted data shares from the storage providers;

communicate the retrieved uncorrupted distributed coded chunks to the decoder;

decode the retrieved uncorrupted distributed coded chunks to obtain the data fields of the input data blocks for the corrupted distributed coded chunks;

re-code the data fields of the input data blocks for the corrupted distributed coded chunks;

communicate re-coded chunks to the distributor to distribute the re-coded chunks to the storage providers based on the user storage constraints; and generate distribution details for the distributed re-coded chunks.

* * * * *